(12) United States Patent
Wu et al.

(10) Patent No.: US 11,968,136 B2
(45) Date of Patent: Apr. 23, 2024

(54) DEMODULATION REFERENCE SIGNAL (DMRS) TRANSMISSION FOR SIDELINK COMMUNICATIONS

(71) Applicant: QUALCOMM Incorporated, San Diego, CA (US)

(72) Inventors: Shuanshuan Wu, San Diego, CA (US); Gabi Sarkis, San Diego, CA (US); Kapil Gulati, Belle Mead, NJ (US); Sudhir Kumar Baghel, Hillsborough, NJ (US); Junyi Li, Chester, NJ (US); Arthur Gubeskys, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/061,932

(22) Filed: Oct. 2, 2020

(65) Prior Publication Data

US 2021/0105118 A1 Apr. 8, 2021

Related U.S. Application Data

(60) Provisional application No. 62/910,894, filed on Oct. 4, 2019.

(51) Int. Cl.
*H04L 5/00* (2006.01)
*H04W 72/20* (2023.01)
(Continued)

(52) U.S. Cl.
CPC ............ *H04L 5/0048* (2013.01); *H04L 5/001* (2013.01); *H04W 72/20* (2023.01);
(Continued)

(58) Field of Classification Search
CPC ..... H04L 5/0048; H04L 5/0092; H04L 5/001; H04W 72/02; H04W 72/0406; H04W 72/0453
See application file for complete search history.

(56) References Cited

U.S. PATENT DOCUMENTS

2009/0201863 A1* 8/2009 Pi ..................... H04L 5/0091
370/329
2017/0094657 A1* 3/2017 Yoon ................. H04W 72/0446
(Continued)

FOREIGN PATENT DOCUMENTS

| CN | 109155986 A | 1/2019 |
|---|---|---|
| CN | 109391972 A | 2/2019 |
| WO | 2017026975 A1 | 2/2017 |

OTHER PUBLICATIONS

CATT: Discussion on Physical Layer Structure in NR V2X, 3GPP Draft, 3GPP TSG RAN WG1 Meeting #96bis, R1-1905351, 3rd Generation Partnership Project (3GPP), Mobile Competence Centre, 650, Route Des Lucioles, F-06921, Sophia-Antipolis Cedex, France, vol. RAN WG1, No. Xi'an, China, Apr. 8, 2019-Apr. 12, 2019, Apr. 3, 2019 (Apr. 3, 2019), XP051707425, 13 Pages, Retrieved from the Internet: URL:http://www.3gpp.org/ftp/tsg%5Fran/WG1%5FRL1/TSGR1%5F96b/Docs/R1%2D1905351%2Ezip [retrieved on Apr. 3, 2019].
(Continued)

*Primary Examiner* — Kevin C. Harper
(74) *Attorney, Agent, or Firm* — MG-IP Law, P.C.

(57) ABSTRACT

Disclosed are techniques for wireless communication. In an aspect, a transmitter user equipment (UE) determines a first demodulation reference signal (DMRS) pattern for a first slot allocated for transmission over a sidelink between the transmitter UE and a receiver UE, wherein the first DMRS pattern is determined based at least on the first slot having a first slot format of two or more slot formats, and transmits, to the receiver UE, DMRS in the first slot according to the first DMRS pattern. In an aspect, the receiver UE determines the first DMRS pattern for the first slot based at least on the
(Continued)

first slot having the first slot format, and receives, from the transmitter UE, DMRS in the first slot according to the first DMRS pattern.

24 Claims, 13 Drawing Sheets

(51) Int. Cl.
*H04W 72/0446* (2023.01)
*H04W 72/0453* (2023.01)
*H04W 92/18* (2009.01)

(52) U.S. Cl.
CPC .... *H04W 72/0446* (2013.01); *H04W 72/0453* (2013.01); *H04W 92/18* (2013.01)

(56) References Cited

U.S. PATENT DOCUMENTS

| | | | | |
|---|---|---|---|---|
| 2018/0124808 | A1 | 5/2018 | Yang et al. | |
| 2018/0167184 | A1* | 6/2018 | Zhou | H04W 56/001 |
| 2019/0007152 | A1* | 1/2019 | Yi | H04L 5/0028 |
| 2020/0022089 | A1* | 1/2020 | Guo | H04W 52/242 |
| 2020/0059337 | A1* | 2/2020 | Yamada | H04L 27/2613 |
| 2020/0146000 | A1* | 5/2020 | Shin | H03G 3/3078 |
| 2020/0313818 | A1* | 10/2020 | Wu | H04W 72/042 |
| 2021/0160852 | A1* | 5/2021 | Zhao | H04W 72/044 |
| 2021/0167928 | A1* | 6/2021 | Xiao | H04W 72/0453 |
| 2021/0250931 | A1* | 8/2021 | Yang | H04L 5/0053 |
| 2021/0314933 | A1* | 10/2021 | Zhang | H04L 1/1607 |
| 2022/0279497 | A1* | 9/2022 | Zhang | H04L 5/0048 |

OTHER PUBLICATIONS

Huawei, et al., "Sidelink Reference Signal Design for NR V2X", 3GPP TSG RAN WG1 Meeting #97, R1-1906009, Reno, USA, May 13-17, 2019, 3rd Generation Partnership Project (3GPP), Mobile Competence Centre, 650 Route Des Lucioles, F-06921, Sophia-Antipolis Cedex France, vol. RAN WG1 No. Reno, USA, May 13, 2019-May 17, 2019, May 13, 2019 (May 13, 2019), XP051727466, 11 Pages, Retrieved from the Internet: URL:http://www.3gpp.org/ftp/Meetings%5F3GPP%5FSYNC/RAN1/Docs/R1%2D1906009%2Ezip [retrieved on May 13, 2019] Section 2.1.

International Search Report and Written Opinion—PCT/US2020/054275—ISA/EPO—Feb. 11, 2021.

Qualcomm: "Remaining Issues on NR DM-RS", 3GPP Draft, R1-1715082, 3GPP TSG RAN WG1 Meeting #90, 3rd Generation Partnership Project (3GPP), Mobile Competence Centre, 650 Route Des Lucioles, F-06921, Sophia-Antipolois Cedex France, vol. RAN WG1, No. Prague, Czech Republic, Aug. 21, 2017-Aug. 25, 2017, Aug. 26, 2017 (Aug. 26, 2017), XP051328568, 28 Pages, Retrieved from the Internet: URL:http://www.3gpp.org/ftp/tsg_ran/WG1_RL1/TSGR1_90/Docs/ [retrieved on Aug. 26, 2017] Sections 1.1-1.3.

* cited by examiner

Pattern for regular slot

Pattern for feedback slot

Pattern for regular slot

Pattern for PSFCH slot

DEMODULATION REFERENCE SIGNAL (DMRS) TRANSMISSION FOR SIDELINK COMMUNICATIONS

CROSS-REFERENCE TO RELATED APPLICATIONS

The present Application for Patent claims the benefit of U.S. Provisional Application No. 62/910,894, entitled "DEMODULATION REFERENCE SIGNAL (DMRS) TRANSMISSION FOR SIDELINK COMMUNICATIONS," filed Oct. 4, 2019, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the global system for mobile communication (GSM), etc.

A fifth generation (5G) wireless standard, referred to as New Radio (NR), enables higher data transfer speeds, greater numbers of connections, and better coverage, among other improvements. The NR standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of NR mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a transmitter user equipment (UE) includes determining a first demodulation reference signal (DMRS) pattern for a first slot allocated for transmission over a sidelink between the transmitter UE and a receiver UE, wherein the first DMRS pattern is determined based at least on the first slot having a first slot format of two or more slot formats, and wherein the first slot format specifies at least a first number of orthogonal frequency-division multiplexing (OFDM) symbols available for sidelink transmission; and transmitting, to the receiver UE, DMRS in the first slot according to the first DMRS pattern.

In an aspect, a method of wireless communication performed by a receiver UE includes determining a first DMRS pattern for a first slot allocated for data reception over a sidelink between the receiver UE and a transmitter UE, wherein the first DMRS pattern is determined based at least on the first slot having a first slot format of two or more slot formats, and wherein the first slot format specifies at least a first number of OFDM symbols available for sidelink transmission and the second slot format specifies a second number of OFDM symbols available for sidelink transmission; and receiving, from the transmitter UE, DMRS in the first slot according to the first DMRS pattern.

In an aspect, a transmitter UE includes a memory; at least one transceiver; and at least one processor communicatively coupled to the memory and the at least one transceiver, the at least one processor configured to: determine a first DMRS pattern for a first slot allocated for transmission over a sidelink between the transmitter UE and a receiver UE, wherein the first DMRS pattern is determined based at least on the first slot having a first slot format of two or more slot formats, and wherein the first slot format specifies at least a first number of OFDM symbols available for sidelink transmission; and cause the at least one transceiver to transmit, to the receiver UE, DMRS in the first slot according to the first DMRS pattern.

In an aspect, a receiver UE includes a memory; at least one transceiver; and at least one processor communicatively coupled to the memory and the at least one transceiver, the at least one processor configured to: determine a first DMRS pattern for a first slot allocated for data reception over a sidelink between the receiver UE and a transmitter UE, wherein the first DMRS pattern is determined based at least on the first slot having a first slot format of two or more slot formats, and wherein the first slot format specifies at least a first number of OFDM symbols available for sidelink transmission; and receive, from the transmitter UE via the at least one transceiver, DMRS in the first slot according to the first DMRS pattern.

In an aspect, a transmitter UE includes means for determining a first DMRS pattern for a first slot allocated for transmission over a sidelink between the transmitter UE and a receiver UE, wherein the first DMRS pattern is determined based at least on the first slot having a first slot format of two or more slot formats, and wherein the first slot format specifies at least a first number of OFDM symbols available for sidelink transmission; and means for transmitting, to the receiver UE, DMRS in the first slot according to the first DMRS pattern.

In an aspect, a receiver UE includes means for determining a first DMRS pattern for a first slot allocated for data reception over a sidelink between the receiver UE and a transmitter UE, wherein the first DMRS pattern is determined based at least on the first slot having a first slot format of two or more slot formats, and wherein the first slot format specifies at least a first number of OFDM symbols available for sidelink transmission; and means for receiving, from the transmitter UE, DMRS in the first slot according to the first DMRS pattern.

In an aspect, a non-transitory computer-readable medium storing computer-executable instructions includes computer-executable instructions comprising: at least one instruction instructing a transmitter UE to determine a first DMRS pattern for a first slot allocated for transmission over a sidelink between the transmitter UE and a receiver UE, wherein the first DMRS pattern is determined based at least on the first slot having a first slot format of two or more slot formats, and wherein the first slot format specifies at least a first number of orthogonal frequency-division multiplexing (OFDM) symbols available for sidelink transmission; and at least one instruction instructing the transmitter UE to transmit, to the receiver UE, DMRS in the first slot according to the first DMRS pattern.

In an aspect, a non-transitory computer-readable medium storing computer-executable instructions includes computer-executable instructions comprising: at least one instruction instructing a receiver UE to determine a first DMRS pattern for a first slot allocated for data reception over a sidelink between the receiver UE and a transmitter UE, wherein the first DMRS pattern is determined based at least on the first slot having a first slot format of two or more slot formats, and wherein the first slot format specifies at least a first number of orthogonal frequency-division multiplexing (OFDM) symbols available for sidelink transmission; and at least one instruction instructing the receiver UE to receive, from the transmitter UE, DMRS in the first slot according to the first DMRS pattern.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
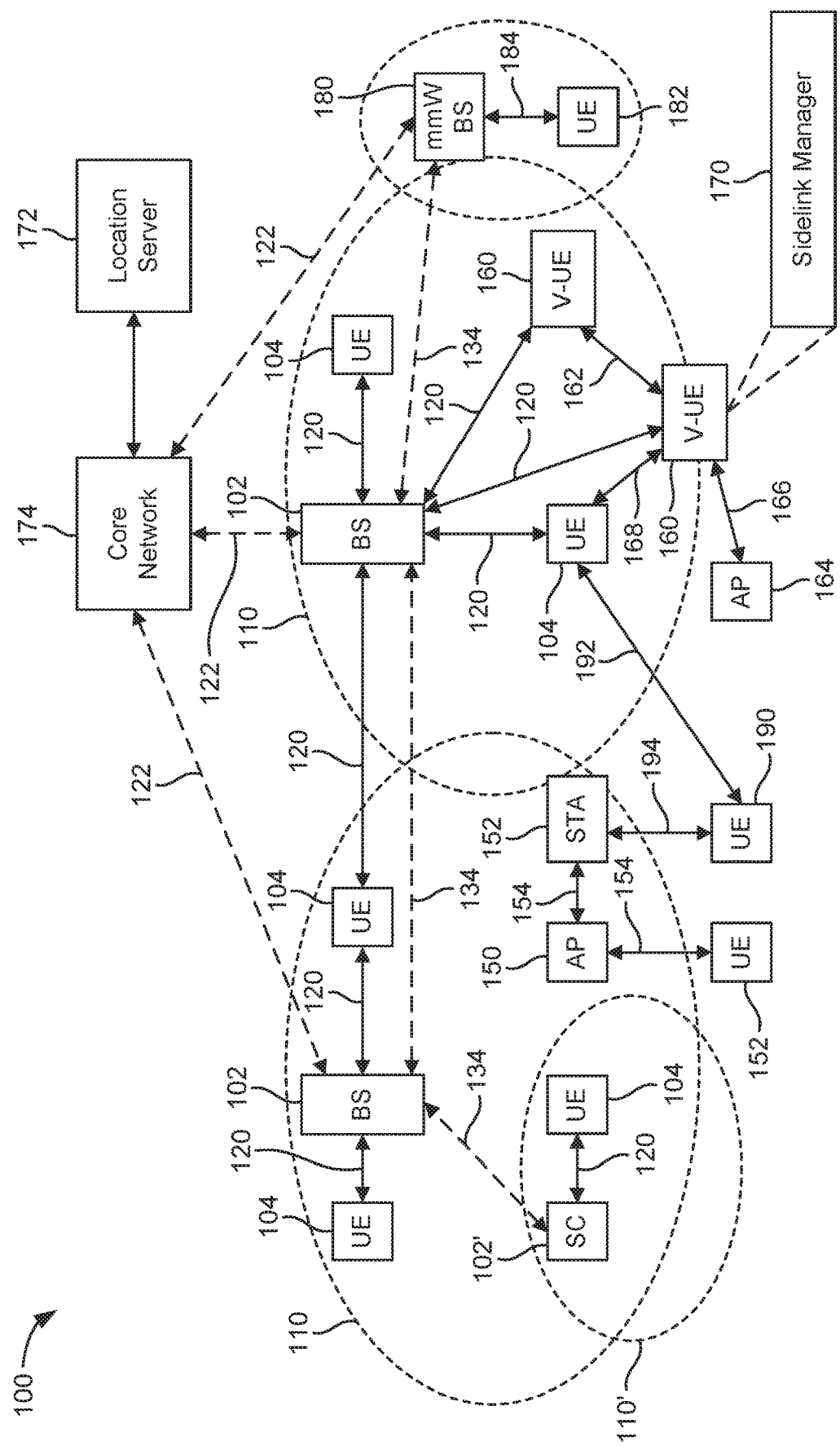
FIG. 1 illustrates an example wireless communications system, according to various aspects of the disclosure.

Aspects of the disclosure are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" (BS) are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

In some cases, a UE may be categorized as a vehicle UE (V-UE) or a pedestrian UE (P-UE). A V-UE is any in-vehicle wireless communication device, such as a navigation system, a warning system, a heads-up display (HUD), an on-board computer, etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. The term "vehicle" may refer to a truck, an automobile, a motorcycle, a train, an airplane, or any other motorized conveyance. A P-UE is a portable wireless communication device that is carried by a pedestrian (i.e., a user that is not driving or riding in a vehicle, but may be riding a bicycle, a scooter, or other non-motorized conveyance).

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an example wireless communications system 100. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 174 (e.g., an evolved packet core (EPC) or 5G core (5GC)) through backhaul links 122, and through the core network 174 to one or more location servers 172 (which may be part of core network 174 or may be external to core network 174). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 (e.g., using the Uu interface). V-UEs 160 may also communicate directly with each other over a wireless unicast sidelink 162, with a roadside access point 164 (also referred to as a "roadside unit") over a sidelink 166, or with UEs 104 over a sidelink 168 using P2P/D2D protocols (e.g., "PC5," an LTE V2X D2D interface) or ProSe direct communications. Sidelink communication may be used for D2D media-sharing, V2V communication, V2X communication (e.g., cellular V2X (cV2X) communication, enhanced V2X (eV2X) communication, etc.), emergency rescue applications, etc. One or more of a group of V-UEs 160 utilizing D2D communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via D2D communications may utilize a one-to-many (1:M) system in which each V-UE 160 transmits to every other V-UE 160 in the group. In some cases, a base station 102 facilitates the scheduling of resources for D2D communications. In other cases, D2D communications are carried out between V-UEs 160 without the involvement of a base station 102. Note that although FIG. 1 illustrates two V-UEs 160 communicating over a sidelink, as will be appreciated, any two or more UEs illustrated in FIG. 1 may communicate over a sidelink, and references to V-UEs 160 are merely examples.

In an aspect, the V-UEs 160, and any other UE illustrated in FIG. 1, may have a sidelink manager 170. The sidelink manager 170 may be a hardware, software, or firmware component that, when executed, causes the V-UE 160 to perform the operations described herein. For example, the sidelink manager 170 may be a software module stored in a memory of the V-UE 160 and executable by a processor of the V-UE 160. As another example, the sidelink manager 170 may be a hardware circuit (e.g., an ASIC, a field programmable gate array (FPGA), etc.) within the V-UE 160. Note that although only one UE (V-UE 160) is illustrated as including a sidelink manager 170, any of the illustrated UEs may include a sidelink manager 170.

In an aspect, the sidelinks 162, 166, 168 may operate over a communication medium of interest, which may be shared with other communications between other vehicles and/or infrastructure access points, as well as other RATs. A "medium" may be composed of one or more frequency, time, and/or space communication resources (e.g., encompassing one or more channels across one or more carriers) associated with communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more roadside access points 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more roadside access points 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards roadside access points 164, towards other UEs (e.g., UEs 104, 152, 182, 190), etc. Thus, in some cases, V-UEs 160 may utilize beamforming over sidelinks 162, 166, and 168.

Figure 2A:
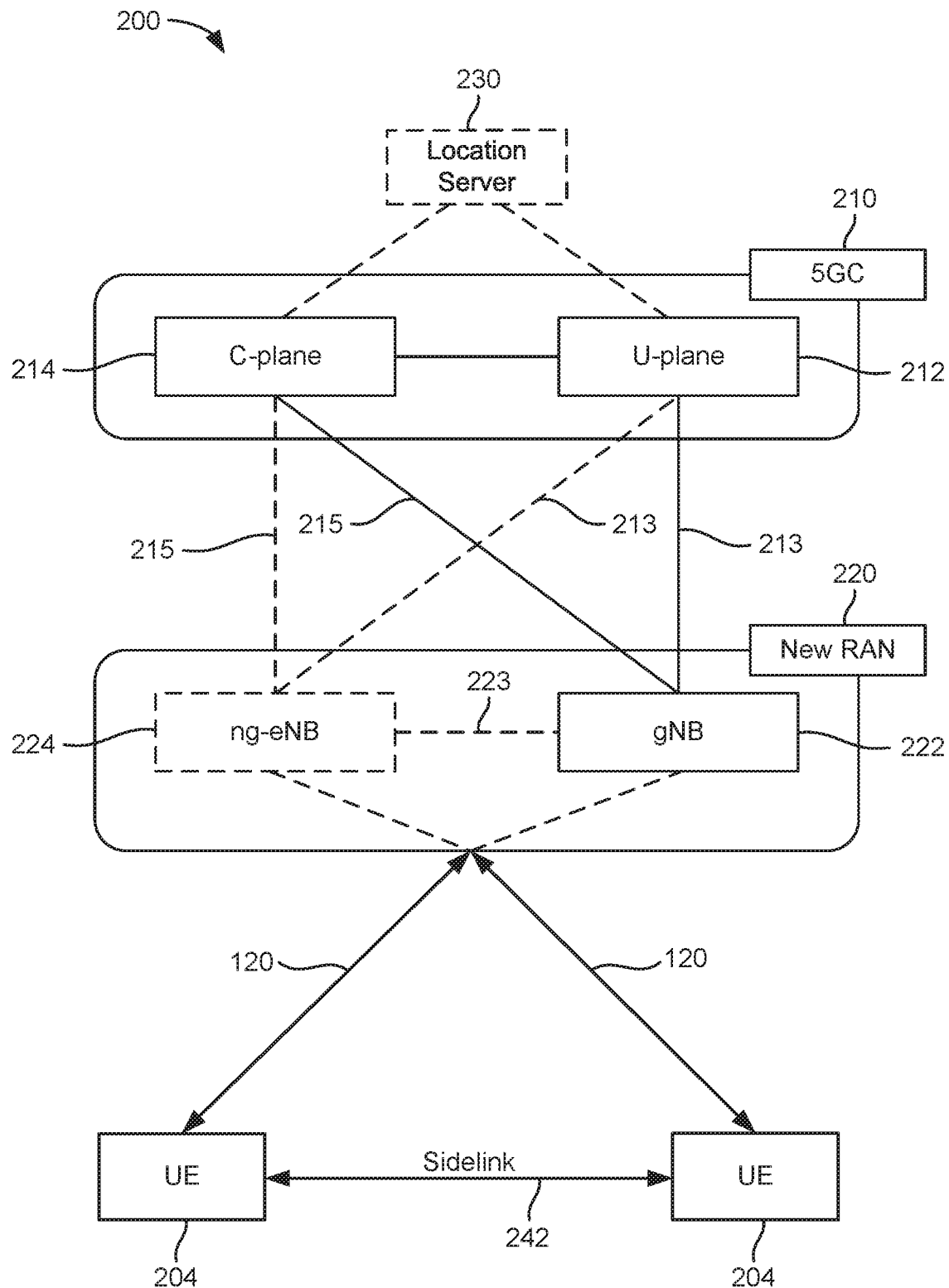
FIGS. 2A and 2B illustrate example wireless network structures, according to various aspects of the disclosure.

According to various aspects, FIG. 2A illustrates an example wireless network structure 200. For example, a 5GC 210 (also referred to as a Next Generation Core (NGC)) can be viewed functionally as control plane functions (C-plane) 214 (e.g., UE registration, authentication, network access, gateway selection, etc.) and user plane functions (U-plane) 212 (e.g., UE gateway function, access to data networks, IP routing, etc.), which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either (or both) gNB 222 or ng-eNB 224 may communicate with UEs 204 (e.g., any of the UEs described herein). Note that although FIG. 2A only illustrates two UEs 204, as will be appreciated, there may be more than two UEs 204, and the two or more UEs 204 may form a sidelink communications group. In an aspect, two or more UEs 204 may communicate with each other over a wireless unicast sidelink 242, which may correspond to wireless unicast sidelink 162 in FIG. 1. Alternatively, each pair of UEs 204 may communicate over a different sidelink 242 than other pairs of UEs 204.

Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
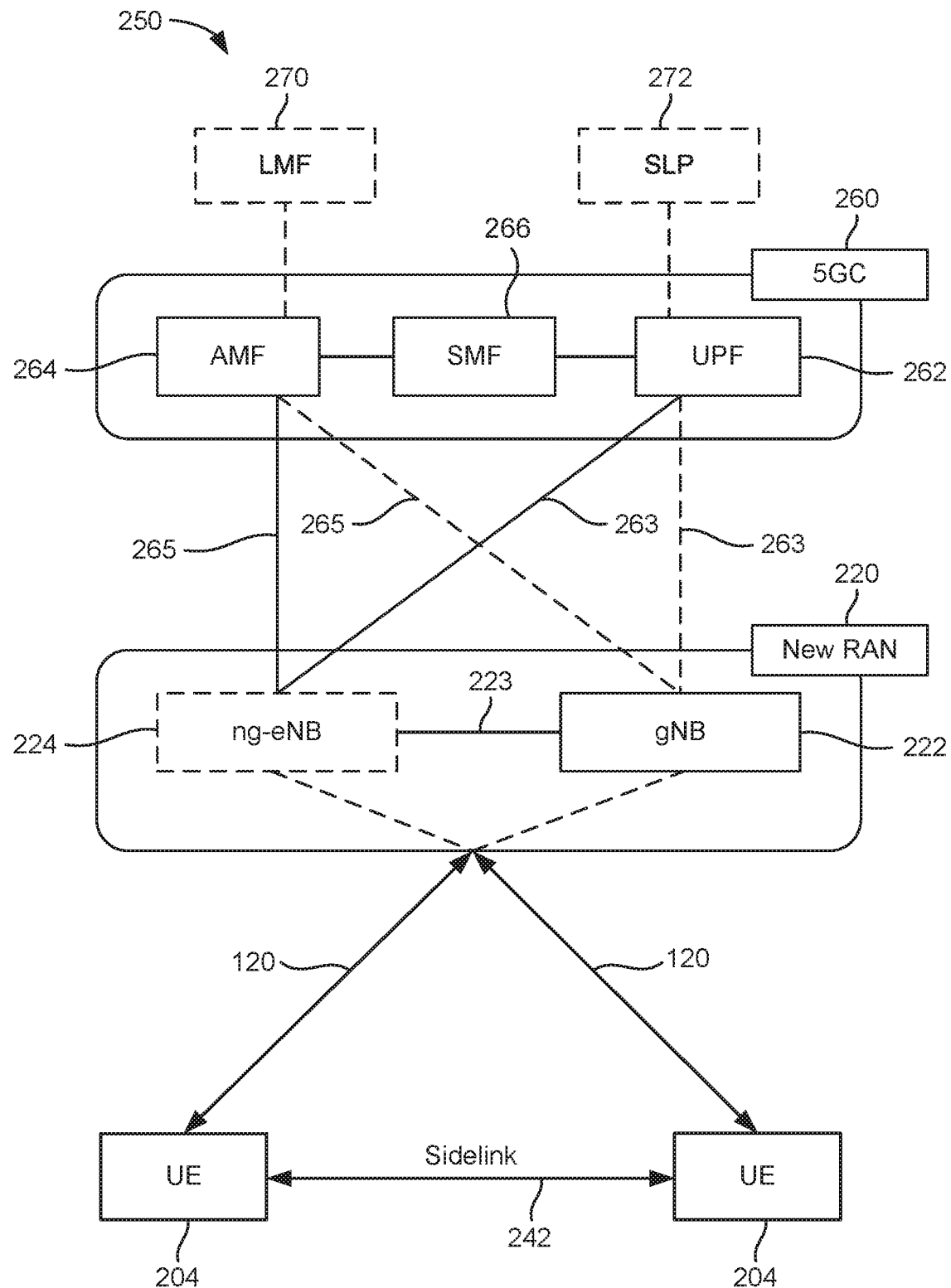

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. The base stations of the New RAN 220 communicate with the AMF 264 over the N2 interface and with the UPF 262 over the N3 interface. Either (or both) gNB 222 or ng-eNB 224 may communicate with UEs 204 (e.g., any of the UEs described herein). In an aspect, two or more UEs 204 may communicate with each other over a wireless unicast sidelink 242, which may correspond to wireless unicast sidelink 162 in FIG. 1.

The functions of the AMF 264 include registration management, connection management, reachability management, mobility management, lawful interception, transport for session management (SM) messages between the UE 204 and a Session Management Function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 which acts as a location server 230, transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server such as a secure user plane location (SUPL) Location Platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270 but, whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g. using protocols intended to carry voice and/or data like the transmission control protocol (TCP) and/or IP).

Figure 3:
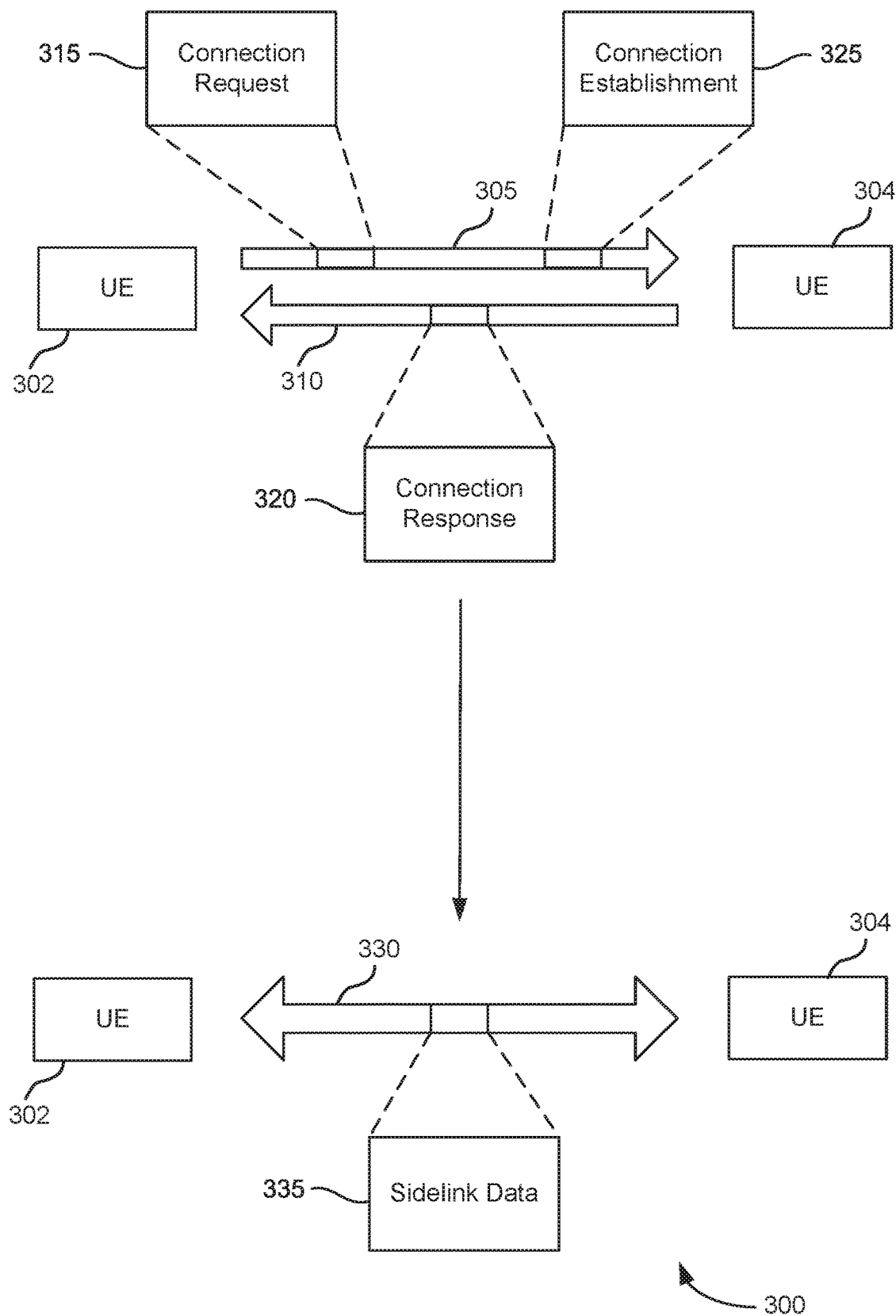
FIG. 3 illustrates an example of a wireless communications system that supports unicast sidelink establishment in accordance with various aspects of the disclosure.

FIG. 3 illustrates an example of a wireless communications system 300 that supports unicast sidelink establishment in accordance with aspects of the disclosure. In some examples, wireless communications system 300 may implement aspects of wireless communications systems 100, 200, and 250. Wireless communications system 300 may include a first UE 302 and a second UE 304, which may be examples of any of the UEs described herein. As a specific example, UEs 302 and 304 may correspond to V-UEs 160 in FIG. 1. In the example of FIG. 3, the UE 302 may attempt to establish a unicast connection over a sidelink with UE 304, which may be a V2X communication link between UE 302 and UE 304. Additionally or alternatively, the unicast connection over the sidelink may generally be used for sidelink communications between any two UEs. Thus, the established sidelink connection may correspond to sidelinks 162 and/or 168 in FIG. 1 and/or wireless unicast sidelink 242 in FIGS. 2A and 2B. The sidelink connection may be established for signaling in an omni-directional frequency range (e.g., FR1) as shown in the upper part of the FIG. 3, and a mmW frequency range (e.g., FR2) for data transmission as shown in the lower part of FIG. 3. In some cases, UE 302 may be referred to as an initiating UE that initiates the unicast connection procedure, and UE 304 may be referred to as a target UE that is targeted for the unicast connection procedure by the initiating UE.

For establishing the unicast connection, access stratum (AS) (a functional layer in the UMTS and LTE protocol stacks between the RAN and the UE that is responsible for transporting data over wireless links and managing radio resources, also referred to as "Layer 2" or "L2") parameters may be configured and negotiated between UE 302 and UE 304. For example, a transmission and reception capability matching may be negotiated between UE 302 and UE 304. Each UE may have different capabilities (e.g., transmission and reception capabilities, 64 quadrature amplitude modulation (QAM), transmission diversity, carrier aggregation (CA) capabilities, supported communications frequency band(s), etc.). In some cases, different services may be supported at the upper layers of corresponding protocol stacks for UE 302 and UE 304. Additionally, a security association may be established between UE 302 and UE 304 for the unicast connection. Unicast traffic may benefit from security protection at a link level (e.g., integrity protection). Security requirements may differ for different wireless communications systems. For example, V2X and Uu systems may have different security requirements (e.g., Uu security does not include confidentiality protection). Additionally, IP configurations (e.g., IP versions, addresses, etc.) may be negotiated for the unicast connection between UE 302 and UE 304.

In some cases, UE 304 may create a service announcement (e.g., a service capability message) to transmit over a cellular network (e.g., cV2X) to assist the unicast connection establishment. Conventionally, UE 302 may identify and locate candidates for unicast communications based on a basic service message (BSM) broadcasted unencrypted by nearby UEs (e.g., UE 304). The BSM may include location information, security and identity information, and vehicle information (e.g., speed, maneuver, size, etc.) for the corresponding UE. However, for different wireless communications systems (e.g., D2D or V2X communications), a discovery channel may not be configured so that UE 302 is able to detect the BSM(s). Accordingly, the service announcement transmitted by UE 304 and other nearby UEs (e.g., a discovery signal) may be an upper layer signal and broadcasted (e.g., in a NR sidelink broadcast). In some cases, UE 304 may include one or more parameters for itself in the service announcement, including connection parameters and/or capabilities it possesses. UE 302 may then monitor for and receive the broadcasted service announcement to identify potential UEs for corresponding unicast connections. In some cases, UE 302 may identify the potential UEs based on the capabilities each UE indicates in their respective service announcements.

The service announcement may include information to assist UE 302 (e.g., or any initiating UE) to identify the UE transmitting the service announcement (UE 304 in the example of FIG. 3). For example, the service announcement may include channel information where direct communication requests may be sent. In some cases, the channel information may be specific to RAT (e.g., LTE or NR) and may include a resource pool within which UE 302 transmits the communication request. Additionally, the service announcement may include a specific destination address for the UE (e.g., a Layer 2 destination address) if the destination address is different from the current address (e.g., the address of the streaming provider or UE transmitting the service announcement). The service announcement may also include a network or transport layer for UE 302 to transmit a communication request on. For example, the network layer (also referred to as "Layer 3" or "L3") or the transport layer (also referred to as "Layer 4" or "L4") may indicate a port number of an application for the UE transmitting the service announcement. In some cases, no IP addressing may be needed if the signaling (e.g., PC5 signaling) carries a protocol (e.g., a real-time transport protocol (RTP)) directly or gives a locally-generated random protocol. Additionally, the service announcement may include a type of protocol for credential establishment and QoS-related parameters.

After identifying a potential unicast connection target (UE 304 in the example of FIG. 3), the initiating UE (UE 302 in the example of FIG. 3) may transmit a connection request 315 to the identified target UE 304. In some cases, the connection request 315 may be a first RRC message transmitted by UE 302 to request a unicast connection with UE 304 (e.g., an RRCDirectConnectionSetupRequest message). For example, the unicast connection may utilize the PC5 interface for the unicast link, and the connection request 315 may be an RRC connection setup request message. Additionally, UE 302 may use a sidelink signaling radio bearer 305 to transport the connection request 315.

After receiving the connection request 315, UE 304 may determine whether to accept or reject the connection request 315. UE 304 may base this determination on a transmission/reception capability, an ability to accommodate the unicast connection over the sidelink, a particular service indicated for the unicast connection, the contents to be transmitted over the unicast connection, or a combination thereof. For example, if UE 302 wants to use a first RAT to transmit or receive data, but UE 304 does not support the first RAT, then UE 304 may reject the connection request 315. Additionally, or alternatively, UE 304 may reject the connection request 315 based on being unable to accommodate the unicast connection over the sidelink due to a limited radio resource, a scheduling issue, etc. Accordingly, UE 304 may transmit an indication of whether the request is accepted or rejected in a connection response 320. Similar to UE 302 and the connection request 315, UE 304 may use a sidelink signaling radio bearer 310 to transport the connection response 320. Additionally, the connection response 320 may be a second RRC message transmitted by UE 304 in response to the connection request 315 (e.g., an RRCDirectConnectionResponse message).

In some cases, sidelink signaling radio bearers 305 and 310 may be the same sidelink radio signal bearer or may be separate sidelink signaling radio bearers. Accordingly, a radio link control (RLC) layer acknowledged mode (AM) may be used for sidelink signaling radio bearers 305 and 310. A UE that supports the unicast connection may listen on a logical channel associated with the sidelink signaling radio bearers. In some cases, the AS layer (i.e., Layer 2) may pass information directly through RRC signaling (e.g., control plane) instead of a V2X layer (e.g., data plane).

If the connection response 320 indicates that UE 304 accepted the connection request 315, UE 302 may then transmit a connection establishment 325 message on the sidelink signaling radio bearer 305 to indicate that the unicast connection setup is complete. In some cases, the connection establishment 325 may be a third RRC message (e.g., an RRCDirectConnectionSetupComplete message). Each of the connection request 315, the connection response 320, and the connection establishment 325 may use a basic capability when being transported from one UE to the other UE to enable each UE to be able to receive and decode the corresponding transmission (e.g., RRC message).

Additionally, identifiers may be used for each of the connection request 315, the connection response 320, and the connection establishment 325 (e.g., the RRC signaling). For example, the identifiers may indicate which UE 302/304 is transmitting which message and/or which UE 302/304 the message is intended for. For physical (PHY) channels, the RRC signaling and any subsequent data transmissions may use the same identifier (e.g., Layer 2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a physical (PHY) layer ACK may be used for ensuring the corresponding messages are transmitted and received properly.

One or more information elements may be included in the connection request 315 and/or the connection response 320 for UE 302 and/or UE 304, respectively, to enable negotiation of corresponding AS layer parameters for the unicast connection. For example, UE 302 and/or UE 304 may include packet data convergence protocol (PDCP) parameters in a corresponding unicast connection setup message to set a PDCP context for the unicast connection. In some cases, the PDCP context may indicate whether or not PDCP duplication is utilized for the unicast connection. Additionally, UE 302 and/or UE 304 may include RLC parameters when establishing the unicast connection to set an RLC context of the unicast connection. For example, the RLC context may indicate whether an AM (e.g., a reordering timer (t-reordering) is used) or an unacknowledged mode (UM) is used for the RLC layer of the unicast communications.

Additionally, UE 302 and/or UE 304 may include medium access control (MAC) parameters to set a MAC context for the unicast connection. In some cases, the MAC context may enable resource selection algorithms, a hybrid automatic repeat request (HARQ) feedback scheme (e.g., ACK or negative ACK (NACK) feedback), parameters for the HARQ feedback scheme, carrier aggregation, or a combination thereof for the unicast connection. Additionally, UE 302 and/or UE 304 may include PHY layer parameters when establishing the unicast connection to set a PHY layer context for the unicast connection. For example, the PHY layer context may indicate a transmission format (unless transmission profiles are included for each UE 302/304) and a radio resource configuration (e.g., bandwidth part (BWP), numerology, etc.) for the unicast connection. These information elements may be supported for different frequency range configurations (e.g., FR1 and FR2).

In some cases, a security context may also be set for the unicast connection (e.g., after the connection establishment 325 message is transmitted). Before a security association (e.g., security context) is established between UE 302 and UE 304, the sidelink signaling radio bearers 305 and 310 may not be protected. After a security association is established, the sidelink signaling radio bearers 305 and 310 may be protected. Accordingly, the security context may enable secure data transmissions over the unicast connection and the sidelink signaling radio bearers 305 and 310. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established). As noted above, UE 304 may base its decision on whether to accept or reject the connection request 315 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, UE 302 and UE 304 may communicate using the unicast connection over a sidelink 330, where sidelink data 335 is transmitted between the two UEs 302 and 304. The sidelink 330 may correspond to sidelinks 162 and/or 168 in FIG. 1 and/or wireless unicast sidelink 242 in FIGS. 2A and 2B. In some cases, the sidelink data 335 may include RRC messages transmitted between the two UEs 302 and 304. To maintain this unicast connection on sidelink 330, UE 302 and/or UE 304 may transmit a keep alive message (e.g., RRCDirectLinkAlive message, a fourth RRC message, etc.). In some cases, the keep alive message may be triggered periodically or on-demand (e.g., event-triggered). Accordingly, the triggering and transmission of the keep alive message may be invoked by UE 302 or by both UE 302 and UE 304. Additionally, or alternatively, a MAC control element (CE) (e.g., defined over sidelink 330) may be used to monitor the status of the unicast connection on sidelink 330 and maintain the connection. When the unicast connection is no longer needed (e.g., UE 302 travels far enough away from UE 304), either UE 302 and/or UE 304 may start a release procedure to drop the unicast connection over sidelink 330. Accordingly, subsequent RRC messages may not be transmitted between UE 302 and UE 304 on the unicast connection.

Figure 4:
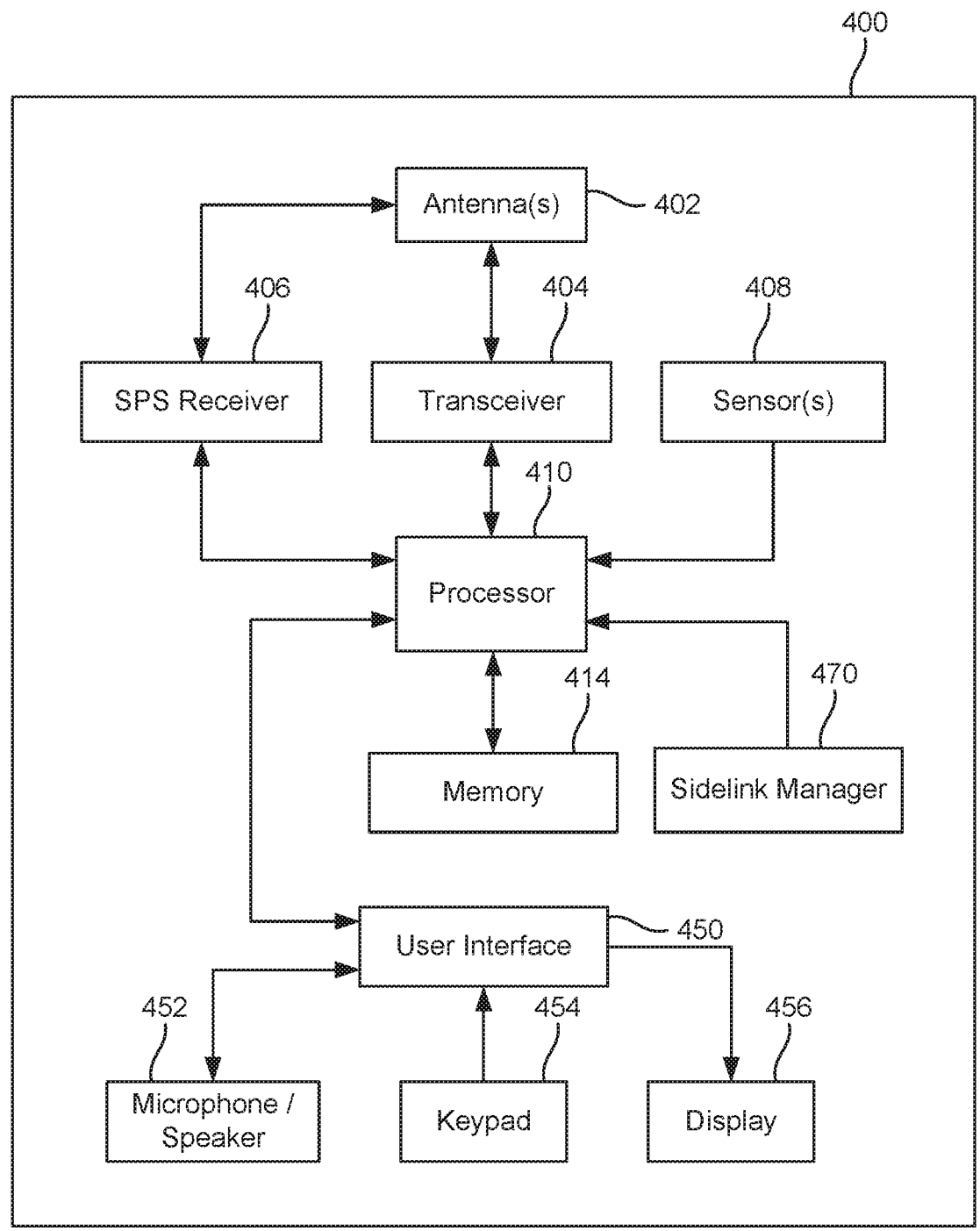
FIG. 4 is a block diagram illustrating an example UE, according to various aspects of the disclosure.

FIG. 4 is a block diagram illustrating various components of an example UE 400, according to aspects of the disclosure. In an aspect, the UE 400 may correspond to any of the UEs described herein. As a specific example, the UE 400 may be a V-UE, such as V-UE 160 in FIG. 1, or any other UE capable of sidelink communication. For the sake of simplicity, the various features and functions illustrated in the block diagram of FIG. 4 are connected together using a common data bus that is meant to represent that these various features and functions are operatively coupled together. Those skilled in the art will recognize that other connections, mechanisms, features, functions, or the like, may be provided and adapted as necessary to operatively couple and configure an actual UE. Further, it is also recognized that one or more of the features or functions illustrated in the example of FIG. 4 may be further subdivided, or two or more of the features or functions illustrated in FIG. 4 may be combined.

The UE 400 may include at least one transceiver 404 connected to one or more antennas 402 providing means for communicating (e.g., means for transmitting, means for receiving, means for measuring, means for tuning, means for refraining from transmitting, etc.) with other network nodes, such as V-UEs (e.g., V-UEs 160), infrastructure access points (e.g., roadside access point 164), P-UEs (e.g., UEs 104), base stations (e.g., base stations 102), etc., via at least one designated RAT (e.g., C-V2X or IEEE 802.11p) over one or more communication links (e.g., communication links 120, sidelinks 162, 166, 168, mmW communication link 184). The transceiver 404 may be variously configured for transmitting and encoding signals (e.g., messages, indications, information, and so on), and, conversely, for receiving and decoding signals (e.g., messages, indications, information, pilots, and so on) in accordance with the designated RAT.

As used herein, a "transceiver" may include at least one transmitter and at least one receiver in an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antenna(s) 402), such as an antenna array, that permits the UE 400 to perform transmit "beamforming," as described herein. Similarly, a receiver may include or be coupled to a plurality of antennas (e.g., antenna(s) 402), such as an antenna array, that permits the UE 400 to perform receive beamforming, as described herein. In an aspect, the transmitter(s) and receiver(s) may share the same plurality of antennas (e.g., antenna(s) 402), such that the UE 400 can only receive or transmit at a given time, not both at the same time. In some cases, a transceiver may not provide both transmit and receive functionalities. For example, a low functionality receiver circuit may be employed in some designs to reduce costs when providing full communication is not necessary (e.g., a receiver chip or similar circuitry simply providing low-level sniffing).

The UE 400 may also include a satellite positioning service (SPS) receiver 406. The SPS receiver 406 may be connected to the one or more antennas 402 and provide means for receiving and/or measuring satellite signals. The SPS receiver 406 may comprise any suitable hardware and/or software for receiving and processing SPS signals, such as global positioning system (GPS) signals. The SPS receiver 406 requests information and operations as appropriate from the other systems, and performs the calculations necessary to determine the UE's 400 position using measurements obtained by any suitable SPS algorithm.

One or more sensors 408 may be coupled to a processing system 410 to provide means for sensing or detecting information related to the state and/or environment of the UE 400, such as speed, heading (e.g., compass heading), headlight status, gas mileage, etc. By way of example, the one or more sensors 408 may include a speedometer, a tachometer, an accelerometer (e.g., a microelectromechanical systems (MEMS) device), a gyroscope, a geomagnetic sensor (e.g., a compass), an altimeter (e.g., a barometric pressure altimeter), etc.

The processing system 410 may include one or more microprocessors, microcontrollers, ASICs, processing cores, digital signal processors, or the like that provide processing functions, as well as other calculation and control functionality. The processing system 410 may include any form of logic suitable for performing, or causing the components of the UE 400 to perform, at least the techniques provided herein. The processing system 410 may therefore provide means for processing, such as means for determining, means for calculating, means for receiving, means for transmitting, means for indicating, etc.

The processing system 410 may also be coupled to a memory 414 providing means for storing data and software instructions for executing programmed functionality within the UE 400. The memory 414 may be on-board the processing system 410 (e.g., within the same integrated circuit (IC) package), and/or the memory 414 may be external to the processing system 410 and functionally coupled over a data bus.

The UE 400 may include a user interface 450 that provides means for providing any suitable interface systems, such as a microphone/speaker 452, keypad 454, and display 456 that allow user interaction with the UE 400. The microphone/speaker 452 provides for voice communication services with the UE 400. The keypad 454 comprises any suitable buttons for user input to the UE 400. The display 456 comprises any suitable display, such as, for example, a backlit liquid crystal display (LCD), and may further include a touch screen display for additional user input modes.

In an aspect, the UE 400 may include a sidelink manager 470 coupled to the processing system 410. The sidelink manager 470 (which may correspond to sidelink manager 170 in FIG. 1) may be a hardware, software, or firmware component that, when executed, causes the UE 400 to perform the operations described herein. For example, the sidelink manager 470 may be a software module stored in memory 414 and executable by the processing system 410. As another example, the sidelink manager 470 may be a hardware circuit (e.g., an ASIC, an FPGA, etc.) within the UE 400. As such, the sidelink manager 470 may provide means for performing the functionality described herein.

Figure 5:
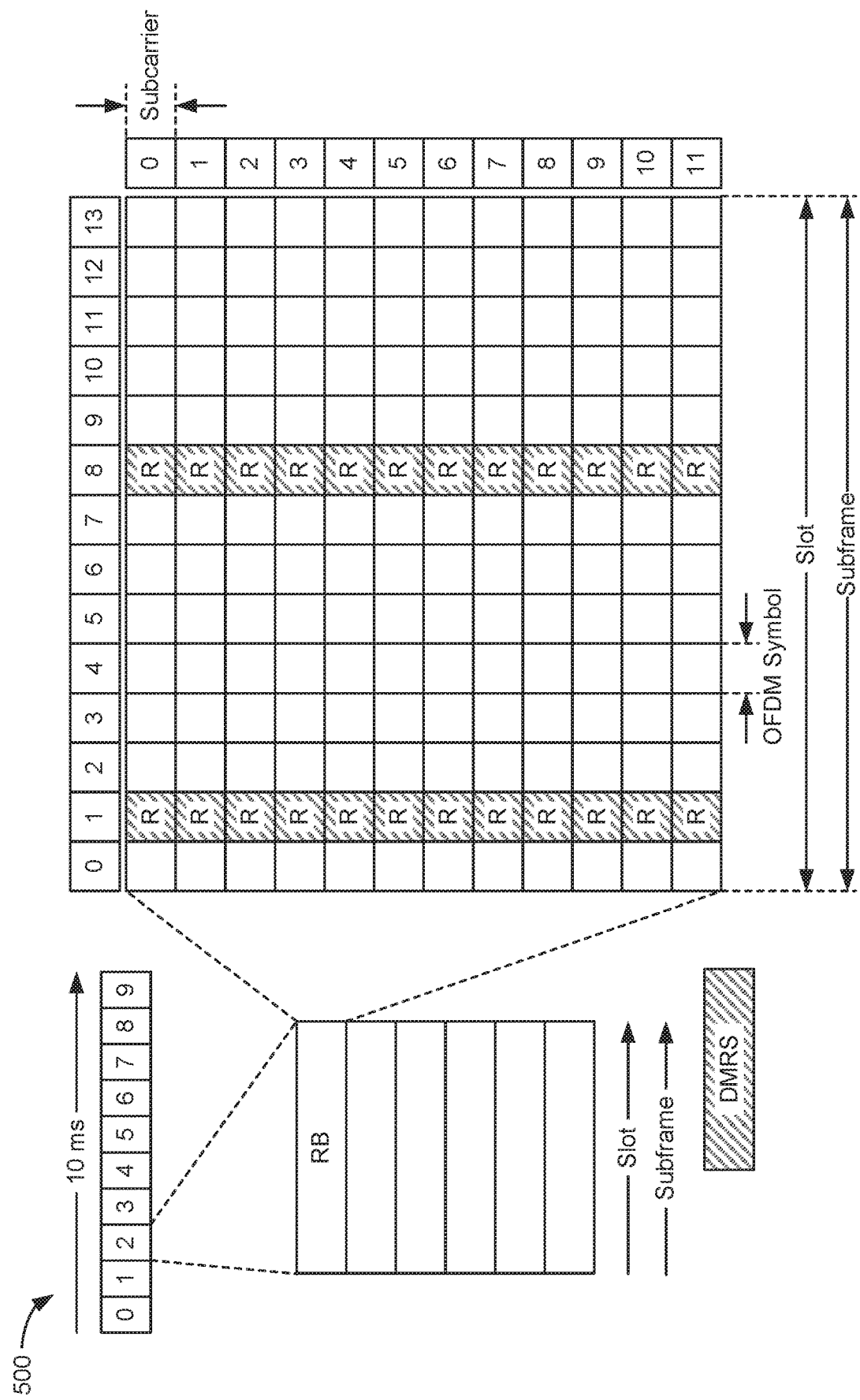
FIG. 5 is a diagram illustrating an example of a frame structure for use in a wireless telecommunications system, according to various aspects of the disclosure.

Various frame structures may be used to support downlink and uplink transmissions between network nodes (e.g., base stations and UEs). FIG. 5 is a diagram 500 of an example of a frame structure, according to aspects of the disclosure. However, as those skilled in the art will readily appreciate, the frame structure for any particular application may be different.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal Fast Fourier Transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies ($\mu$), for example, subcarrier spacing of 15 kHz, 30 kHz, 60 kHz, 120 kHz, and 240 kHz or greater may be available. Table 1 provided below lists some various parameters for different NR numerologies.

TABLE 1

| μ | SCS (kHz) | Symbols/ Sot | Slots/ Subframe | Slots/ Frame | Slot Duration (ms) | Symbol Duration (μs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the example of FIG. 5, a numerology of 15 kHz is used. Thus, in the time domain, a 10 millisecond (ms) frame is divided into 10 equally sized subframes of 1 ms each, and each subframe includes one time slot. In FIG. 5, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 5, for a normal cyclic prefix (CP), an RB may contain 12 consecutive subcarriers in the frequency domain and seven consecutive symbols in the time domain, for a total of 84 REs. For an extended CP, an RB may contain 12 consecutive subcarriers in the frequency domain and six consecutive symbols in the time domain, for a total of 72 REs. The number of bits carried by each RE depends on the modulation scheme.

Some of the REs carry reference (pilot) signals (RS). Downlink reference signals (DL-RS) may include DL-PRS, TRS, PTRS, CRS, CSI-RS, DMRS, PSS, SSS, SSB, etc. Uplink reference signals (UL-RS) may include SRS, SRS-for-positioning (referred to as "UL-PRS"), DMRS, etc. Sidelink reference signals may include DMRS and other sidelink synchronization signals.

FIG. 5 illustrates example locations of REs carrying DMRS (labeled "R"). In an aspect, the reference signals may be demodulation reference signals (DMRS). DMRS are specific to specific UEs, and are used to estimate the radio channel between a transmitter and a receiver for demodulation of the associated physical channel. A transmitter can beamform the DMRS, keep it within a scheduled resource, and transmit it only when necessary in either the downlink or the uplink. Additionally, multiple orthogonal DMRS can be allocated to support MIMO transmission. DMRS information is provided for the initial decoding requirements that low-latency applications need, but only occasionally for low-speed scenarios in which the channel shows little change. In high-mobility scenarios to track fast changes in the channel, the rate of transmission of DMRS may be increased (referred to as "additional DMRS").

For example, in a V2X communications system, sidelink communications between UEs (e.g., V-UEs 160, UEs 204) may occur while one or both UEs are moving. For example, a first UE may be traveling at a first speed and may attempt to transmit or receive communications with a neighboring UE (e.g., via sidelink transmission) traveling at a different speed. In some cases, the difference in the UEs' speeds may range from a few kilometers per hour (kmph) to about 500 kmph. When the relative speed between the UEs is high, more frequent transmissions of DMRS in the time domain are needed to recover the channel. When the relative speed is low, however, the more frequent DMRS transmissions are simply extra overhead, causing decreased spectral efficiency. As such, it would be beneficial to use different DMRS patterns with different time densities for sidelink data transmissions in V2X communications. It may also be beneficial if DMRS patterns could be dynamically indicated by the transmitting UE.

In addition, multiple slot formats may be needed for sidelink communications. For example, some slots may have OFDM symbols allocated for sidelink HARQ feedback (or another signal/channel) transmissions, while other slots may be dedicated to sidelink communication. In another example, some slots may have fewer OFDM symbols available or allocated for sidelink transmission. Therefore, the number of OFDM symbols available for sidelink data transmission, including DMRS, may vary per type of slot.

Accordingly, the present disclosure provides techniques for indicating and interpreting DMRS patterns for sidelink communications. More specifically, the present disclosure provides techniques for selecting a DMRS pattern (e.g., dynamically) and utilizing simplified signaling to indicate the DMRS pattern regardless of slot format. In that way, the transmitting and receiving UEs will have the same understanding of the DMRS pattern being used, while at the same time keeping signaling overhead low.

The following is a summary of certain aspects from the perspective of a receiver UE (e.g., any of the UEs described above with reference to FIGS. 1-4). To receive a sidelink transmission, such as a sidelink data transmission on a sidelink shared channel, the receiver UE can determine one or a set of DMRS patterns for a slot with sidelink transmission, based at least on the format of the slot (e.g., containing HARQ feedback symbols or not). The receiver UE can then receive sidelink transmissions in the slot using the determined DMRS pattern. When there are multiple DMRS patterns determined for a slot format, the receiver UE can determine a DMRS pattern based on an indication from the transmitter UE in, for example, sidelink control information (SCI) associated with the sidelink transmission.

The following is a summary of certain aspects from the perspective of a transmitter UE (e.g., any of the UEs described above with reference to FIGS. 1-4). To transmit a sidelink transmission, the transmitter UE can determine a DMRS pattern for a slot with sidelink transmission, based at least on the format of the slot (e.g., containing HARQ feedback symbols or not). The transmitter UE can then transmit DMRS in the slot based on the determined DMRS pattern. Alternatively, the transmitter UE can first determine a set of DMRS patterns based on the format of the slot, then determine the DMRS pattern from the set of DMRS patterns. Note that when there are multiple candidate DMRS patterns (e.g., a set of DMRS patterns), the transmitter UE can select one DMRS pattern and transmit an indication to the receiver UE to indicate the selected DMRS pattern (e.g., in SCI associated with the sidelink transmission).

For different DMRS patterns in a set, at least one of the following can be different: (1) the number of OFDM symbols allocated to DMRS, (2) the location of the OFDM symbols allocated to DMRS, or (3) the DMRS types (i.e., type A or B). In one example, DMRS types A and B may have different locations and/or densities of DMRS tones/subcarriers in a DMRS symbol. For different slot formats, at least one of the following can be different: (1) the number of OFDM symbols available for the sidelink transmission, (2) the number of OFDM symbols available for a sidelink data channel transmission, (3) the starting location of OFDM symbols available for the sidelink transmission, (4) the starting location of OFDM symbols available for a sidelink data channel transmission, (5) an ending location of OFDM symbols available for transmission on the sidelink, or (6) an ending location of OFDM symbols available for the sidelink data channel.

A UE performing sidelink data transmission/reception may have a (pre)configured subcarrier spacing (SCS) (or carrier frequency) for the sidelink. In an aspect, the determination of one or a set of DMRS patterns for sidelink transmissions can also be based on the SCS or frequency range (FR) of the sidelink. That means, for different SCS or FR, the determined one or a set of DMRS for sidelink transmissions may be different for the same slot format (see Table 1). The reason is that the larger the SCS, the smaller the duration of an OFDM symbol, and thus, fewer DMRS may be needed. For example, for a certain SCS (e.g., 30 kHz) or a certain FR (e.g., FR1), one or a set of DMRS patterns may be (pre)configured for each slot format. Thus, one or a set of DMRS patterns can be used in a certain slot depending on both the SCS (and/or FR) and the slot format (e.g., containing HARQ feedback symbols or not).

There may be two or more slot formats utilized on a sidelink. The slot format may be based on the number of OFDM symbols available for sidelink data transmission. For example, fewer OFDM symbols are available for sidelink data transmission in a slot containing OFDM symbols allocated to HARQ feedback (or simply "feedback") transmission. In an aspect, a set of DMRS patterns may be (pre)configured for each slot format. Thus, the DMRS patterns included in the set of DMRS patterns may be different for different slot formats. The DMRS patterns in the set may also depend on the SCS or FR of the sidelink, as discussed above.

Referring to using multiple (a set of) DMRS patterns for a particular slot format in greater detail, a UE (whether transmitting or receiving) first determines the set of DMRS patterns based on the slot format that is currently being used for sidelink transmission. The determination may also depend on the SCS or FR of the sidelink. If the UE is transmitting, the UE then selects one DMRS pattern from the set, transmits DMRS in the current slot based on the DMRS pattern and, at substantially the same time, may transmit an index value to the selected DMRS pattern in SCI. In an aspect, the DMRS pattern may be selected from the set based on the relative speed(s) of the UEs, (statistical) HARQ feedback, and/or the like. If the UE is receiving, the UE receives the DMRS index value from the transmitting UE (e.g., in SCI), determines a DMRS pattern based on the index and the (pre)configured set of DMRS patterns, and then receives sidelink transmission in the slot based on the determined DMRS pattern.

In an aspect, instead of a set of DMRS patterns being (pre)configured for each slot format, only one DMRS pattern may be (pre)configured for each slot format. A different DMRS pattern may be used for each slot format. The one DMRS pattern for each slot format may also depend on the SCS or FR of the sidelink. That is, for the same slot format, the (pre)configured DMRS pattern may be different for different SCS or FR.

Referring to using one DMRS pattern per slot format in greater detail, a UE (whether transmitting or receiving) first determines the DMRS pattern based on the slot format that is currently being used for sidelink transmission. The determination may also depend on the SCS or FR of the sidelink. If the UE is transmitting, the UE transmits DMRS in the current slot based on the determined DMRS pattern. If the UE is receiving, the UE receives sidelink transmission in the slot based on the determined DMRS pattern.

In an aspect, the various DMRS patterns described herein may be configured to a UE by the serving base station or some other network entity. Alternatively, they may be preconfigured to the UE by, for example, an original equipment manufacturer (OEM), so that the UE can communicate on the sidelink without the involvement of network entities.

Figure 6:
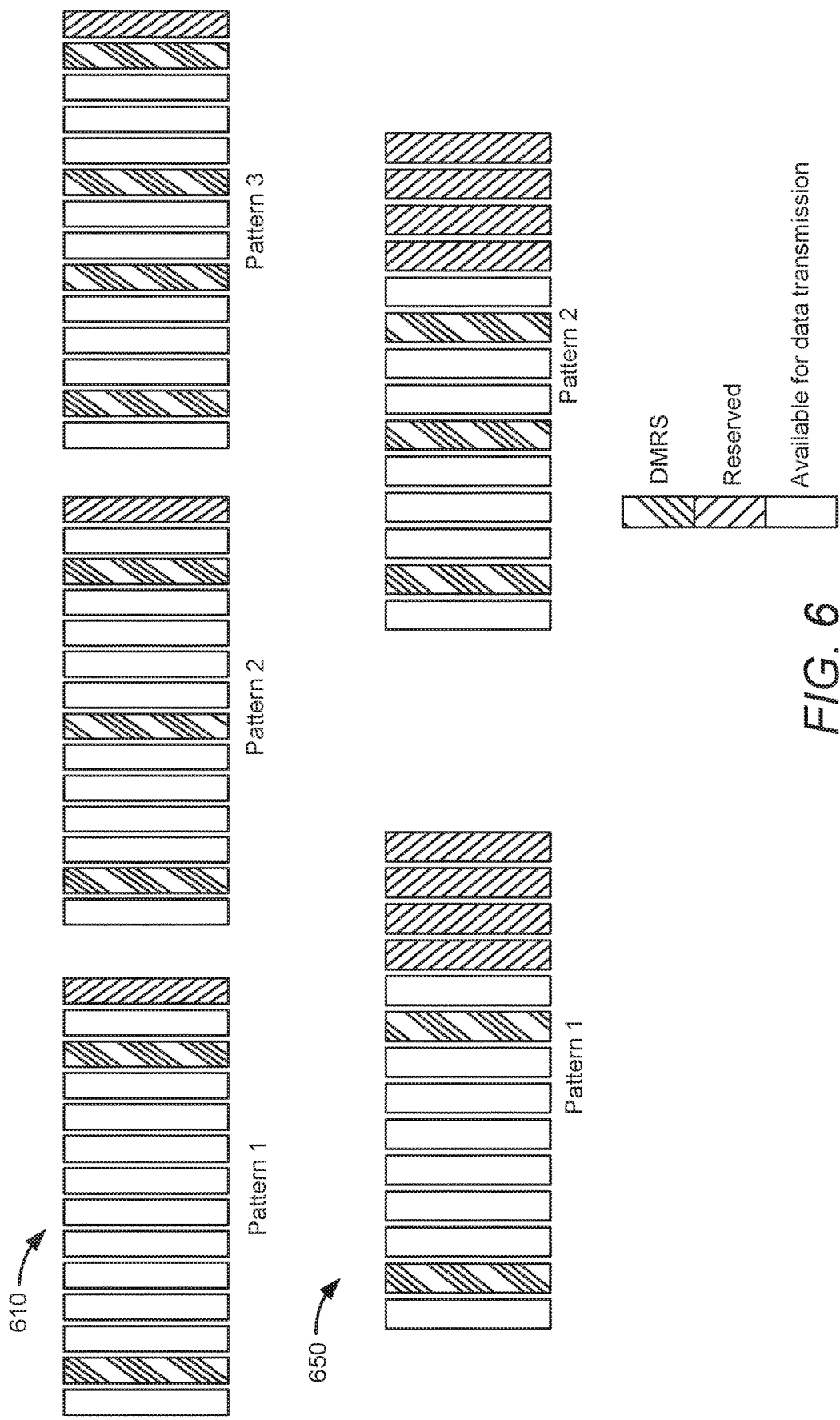
FIGS. 6 to 10 illustrate example demodulation reference signal (DMRS) patterns, according to various aspects of the disclosure.

FIG. 6 illustrates example sets of DMRS patterns for two different slot formats, according to aspects of the disclosure. In the example of FIG. 6, a sidelink has two slot formats, one for sidelink slots with HARQ feedback resources (i.e., with symbols allocated for HARQ feedback) and the other for sidelink slots without HARQ feedback resources (i.e., without symbols allocated for HARQ feedback). For a normal (or extended) CP, sidelink slots without HARQ feedback resources may have 12, 13, or 14 (or 10, 11, or 12 for extended CP) OFDM symbols available for sidelink data channel transmission. Sidelink slots with HARQ feedback resources may have 9 or 10 (or 7 or 8 for extended CP) OFDM symbols available for sidelink data channel transmission.

In the example of FIG. 6, two sets of DMRS patterns have been (pre)configured, one for each of the two slot formats. The set of DMRS patterns 610 for a regular slot (i.e., a sidelink slot without HARQ feedback resources) includes three DMRS patterns. The set of DMRS patterns 650 for HARQ feedback slots (e.g., physical sidelink feedback channel (PSFCH) slots) includes two DMRS patterns. The DMRS pattern in each set has an index. For the set of DMRS patterns 610, the indices may be "0," "1," and "2" for the three patterns. For the set of DMRS patterns 650, the indices may be "0" and "1" for the two patterns.

In an example operation, when a transmitter UE determines that the current slot is a regular slot (i.e., no HARQ feedback), it selects one of the three patterns from the set of DMRS patterns 610. In the example of FIG. 6, the first pattern (labeled "Pattern 1") of the set of DMRS patterns 610 has two OFDM symbols allocated to DMRS, the second pattern (labeled "Pattern 2") has three OFDM symbols allocated to DMRS, and the third pattern (labeled "Pattern 3") has four OFDM symbols allocated to DMRS. Thus, as an example, the transmitter UE may select the third pattern for high-speed scenarios and the first pattern for low speed scenarios. The transmitter UE then transmits the index value ("0," "1," or "2") of the selected DMRS pattern to the receiver UE in SCI, and uses the selected DMRS pattern for sidelink transmission in the current slot.

When the transmitter UE determines that the slot is a HARQ feedback slot, it selects one of the two patterns from the set of DMRS patterns 650. In the example of FIG. 6, the first pattern (labeled "Pattern 1") of the set of DMRS patterns 650 has two OFDM symbols allocated to DMRS, and the second pattern (labeled "Pattern 2") has three OFDM symbols allocated to DMRS. Thus, as an example, the transmitter UE may select the second pattern for high-speed scenarios and the first pattern for low speed scenarios. The transmitter UE then transmits the index value ("0" or "1") of the selected DMRS pattern to the receiver UE in SCI, and uses the selected DMRS pattern for sidelink transmission in the current slot.

When the receiver UE receives the DMRS pattern index value "0," for example, from the transmitter UE in SCI, it determines that the first pattern in the set of DMRS patterns 610 has been selected by the transmitter UE if the current slot is a regular slot. Or, if the slot is a HARQ feedback slot, the receiver UE determines that the first pattern in the set of DMRS patterns 650 has been selected by the transmitter UE. In one example, the DMRS patterns shown in FIG. 6 may be specified for a certain FR (e.g., FR1) or SCS (e.g., 30 kHz). For a different FR or SCS, there may be another set of DMRS patterns specified.

Figure 7:
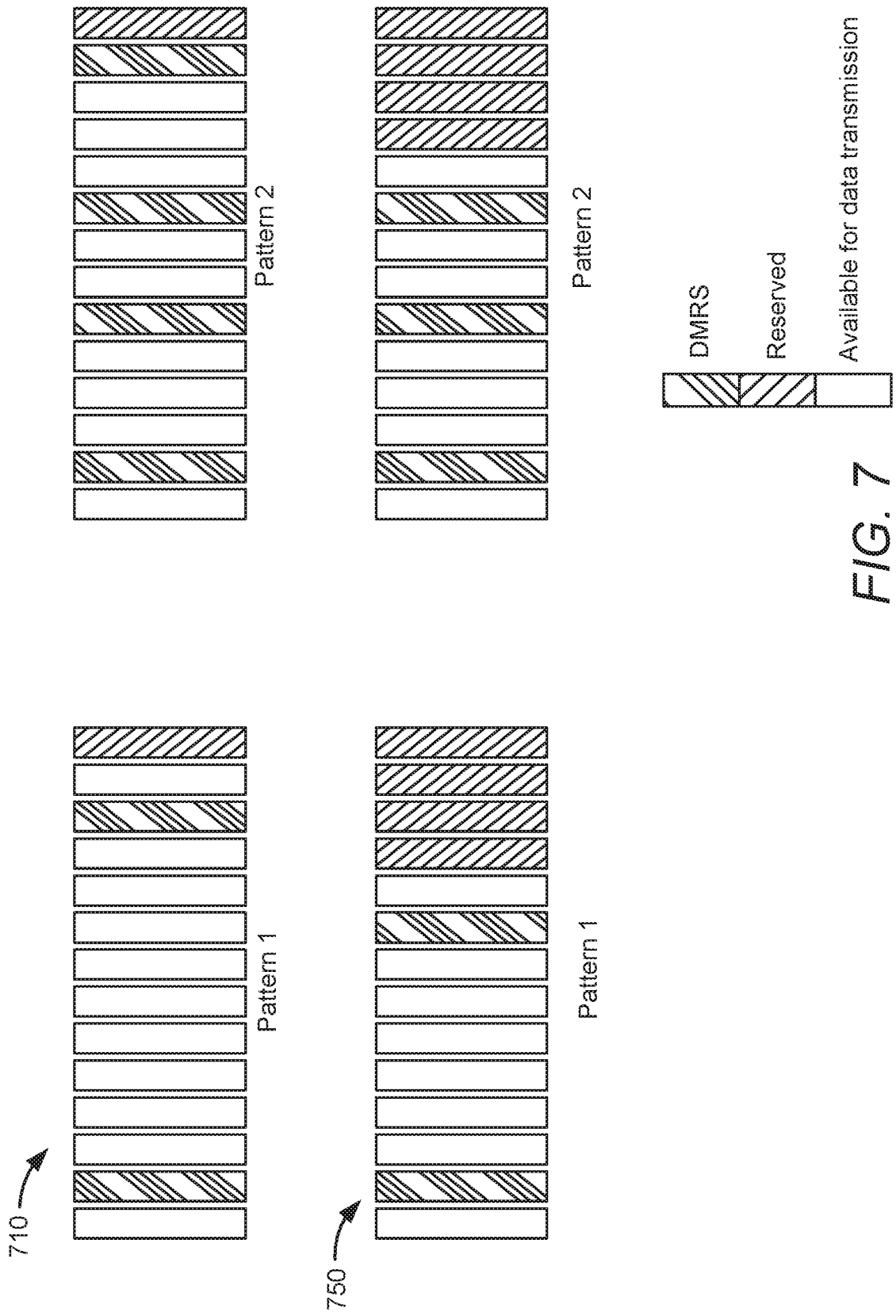

FIG. 7 illustrates example sets of DMRS patterns for two different slot formats, according to aspects of the disclosure. In the example of FIG. 7, there are two slot formats for sidelink communications specified, one for sidelink slots with HARQ feedback resources and the other for sidelink slots without HARQ feedback resources. As described above with reference to FIG. 6, for a normal (or extended) CP, sidelink slots without HARQ feedback resources may have 12, 13, or 14 (or 10, 11, or 12 for extended CP) OFDM symbols available for sidelink data channel transmission. Sidelink slots with HARQ feedback resources may have 9 or 10 (or 7 or 8 for extended CP) OFDM symbols available for sidelink data channel transmission.

In the example of FIG. 7, two sets of DMRS patterns have been (pre)configured, one for each of the two slot formats. The set of DMRS patterns 710 for a regular slot includes two DMRS patterns, and the set of DMRS patterns 750 for HARQ feedback slots also includes two DMRS patterns. The DMRS pattern in each set has an index. For the set of DMRS patterns 710, the indices may be "0" and "1" for the two patterns, and for the set of DMRS patterns 750, the indices may again be "0" and "1" for the two patterns.

In an example operation, when a transmitter UE determines that the current slot is a regular slot, it selects one of the two patterns from the set of DMRS patterns 710. The transmitter UE then transmits the index value ("0" or "1") of the selected DMRS pattern to the receiver UE in SCI, and uses the selected DMRS pattern for sidelink transmission in the current slot. Alternatively, when the transmitter UE determines that the slot is a HARQ feedback slot, it selects one of the two patterns from the set of DMRS patterns 750. The transmitter UE then transmits the index value ("0" or "1") of the selected DMRS pattern to the receiver UE in SCI, and uses the selected DMRS pattern for sidelink transmission in the current slot.

When the receiver UE receives the DMRS pattern index value "0," for example, from the transmitter UE in SCI, it determines that the first pattern in the set of DMRS patterns 710 has been selected by the transmitter UE if the current slot is a regular slot. Or, if the slot is a HARQ feedback slot, the receiver UE determines that the first pattern in the set of DMRS patterns 750 has been selected by the transmitter UE. In one example, the DMRS patterns shown in FIG. 7 may be specified for a certain FR (e.g., FR1) or SCS (e.g., 30 kHz). For a different FR or SCS, there may be another set of DMRS patterns specified.

Figure 8:
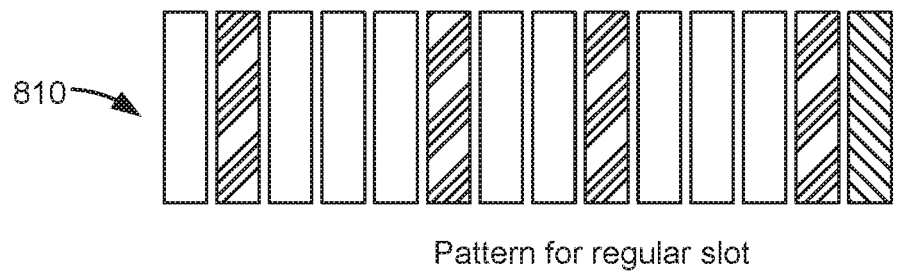
Figure 8:
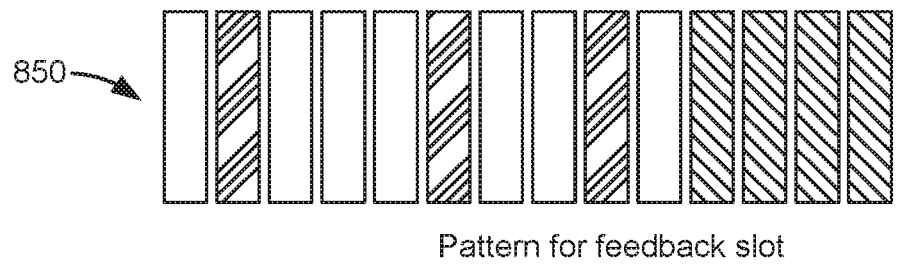
Figure 8:
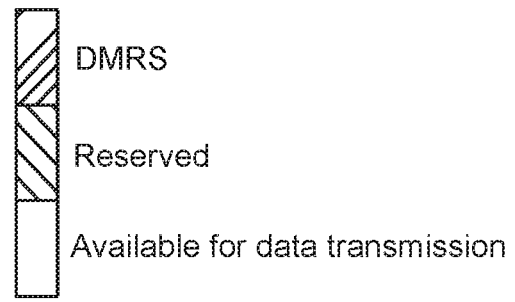

FIG. 8 illustrates example DMRS patterns for two different slot formats, according to aspects of the disclosure. In the example of FIG. 8, a sidelink has two slot formats, one for sidelink slots with HARQ feedback resources and the other for sidelink slots without HARQ feedback resources. As described above with reference to FIG. 6, for a normal (or extended) CP, sidelink slots without HARQ feedback resources may have 12, 13, or 14 (or 10, 11, or 12 for extended CP) OFDM symbols available for sidelink data channel transmission. Sidelink slots with HARQ feedback resources may have 9 or 10 (or 7 or 8 for extended CP) OFDM symbols available for sidelink data channel transmission.

In the example of FIG. 8, two DMRS patterns have been (pre)configured, one for each of the two slot formats. Note that using a single DMRS pattern per slot format type, as illustrated in FIG. 8, may be for a specific SCS or FR. The DMRS pattern 810 is for regular slots and the DMRS pattern 850 is for HARQ feedback slots. Because there is only one DMRS pattern per slot format, there is no need for an index value for the DMRS patterns. Rather, when a transmitter UE determines that the current slot is a regular slot, it simply uses the DMRS pattern 810 for sidelink transmission in the current slot. Alternatively, when the transmitter UE determines that the slot is a HARQ feedback slot, it uses the DMRS pattern 850 for sidelink transmission in the current slot.

On the receiver UE side, if the current slot is a regular slot, the receiver UE determines that the DMRS pattern 810 applies to the slot. If, however, the slot is a HARQ feedback slot, the receiver UE determines that the DMRS pattern 850 applies to the slot. In one example, the DMRS patterns shown in FIG. 8 may be specified for a certain FR (e.g., FR1) or SCS (e.g., 30 kHz). For a different FR or SCS, there may be another set of DMRS patterns specified.

Figure 9:
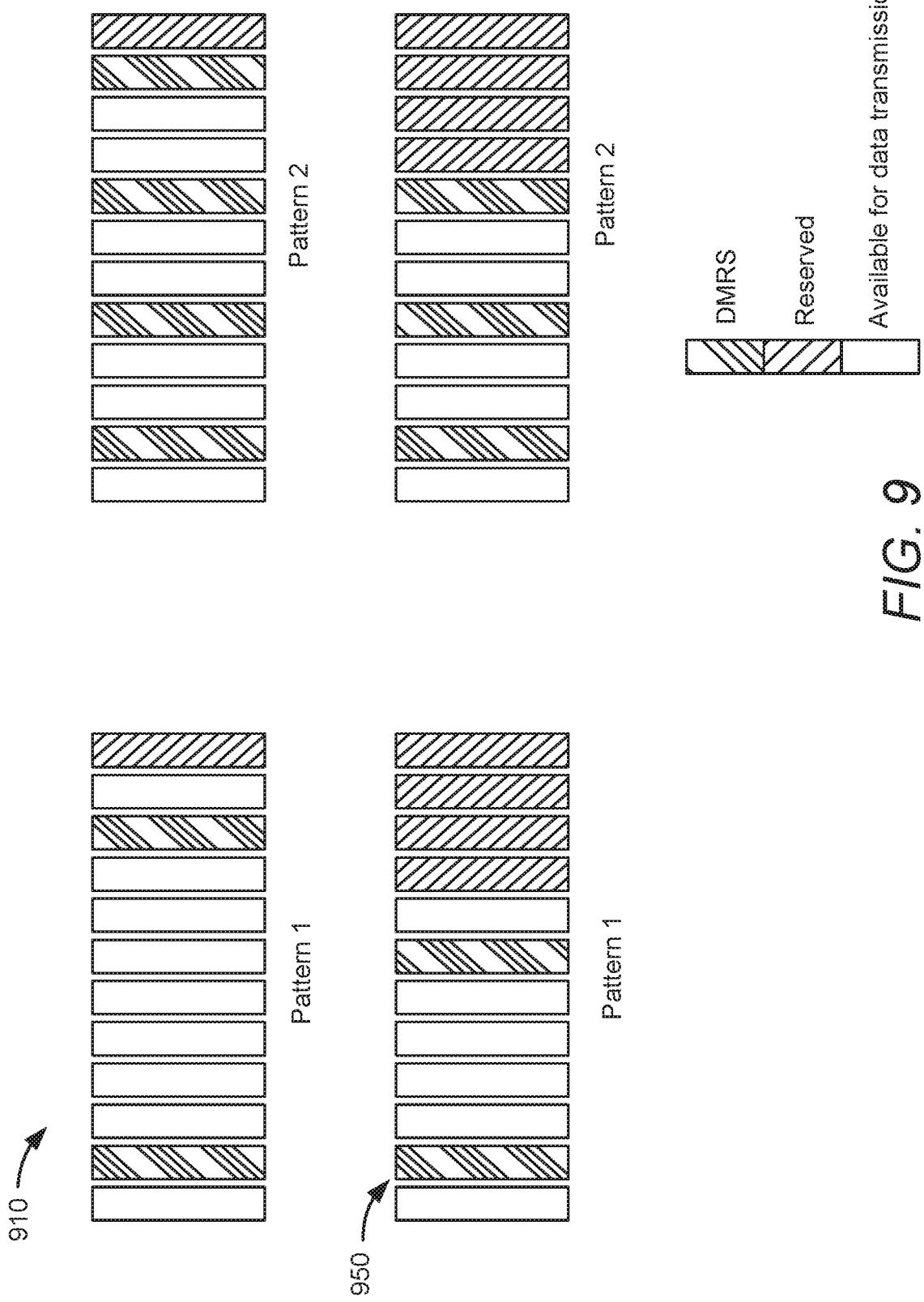

FIG. 9 illustrates example sets of DMRS patterns for two different slot formats, according to aspects of the disclosure. In the example of FIG. 9, a sidelink has two slot formats, one for sidelink slots with HARQ feedback resources and the other for sidelink slots without HARQ feedback resources. In the example of FIG. 9, an extended CP is being used, meaning that slots without HARQ feedback resources have 10, 11, or 12 OFDM symbols available for sidelink data channel transmission. Sidelink slots with HARQ feedback resources have 7 or 8 OFDM symbols available for sidelink data channel transmission.

In the example of FIG. 9, two sets of DMRS patterns have been (pre)configured, one for each of the two slot formats. The set of DMRS patterns 910 for a regular slot includes two DMRS patterns and the set of DMRS patterns 950 for HARQ feedback slots also includes two DMRS patterns. The DMRS pattern in each set has an index. For the set of DMRS patterns 910, the indices may be "0" and "1" for the two patterns, and for the set of DMRS patterns 950, the indices may again be "0" and "1" for the two patterns.

In an example operation, when a transmitter UE determines that the current slot is a regular slot, it selects one of the two patterns from the set of DMRS patterns 910. The transmitter UE then transmits the index value ("0" or "1") of the selected DMRS pattern to the receiver UE in SCI, and uses the selected DMRS pattern for sidelink transmission in the current slot. Alternatively, when the transmitter UE determines that the slot is a HARQ feedback slot, it selects one of the two patterns from the set of DMRS patterns 950. The transmitter UE then transmits the index value ("0" or "1") of the selected DMRS pattern to the receiver UE in SCI, and uses the selected DMRS pattern for sidelink transmission in the current slot.

When the receiver UE receives the DMRS pattern index value "0," for example, from the transmitter UE in SCI, it determines that the first pattern in the set of DMRS patterns 910 has been selected by the transmitter UE if the current slot is a regular slot. Or, if the slot is a HARQ feedback slot, the receiver UE determines that the first pattern in the set of DMRS patterns 950 has been selected by the transmitter UE. In one example, the DMRS patterns shown in FIG. 9 may be specified for a certain FR (e.g., FR1) or SCS (e.g., 30 kHz). For a different FR or SCS, there may be another set of DMRS patterns specified.

Figure 10:
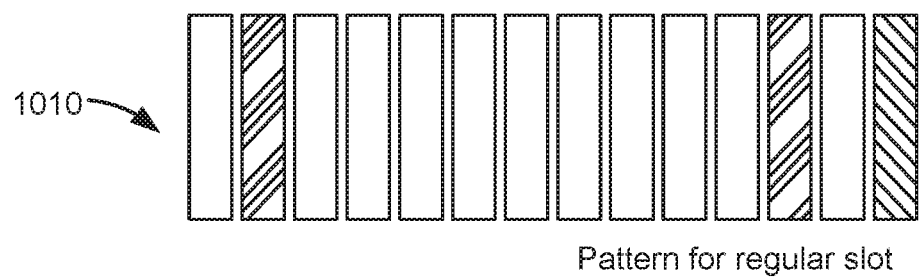
Figure 10:
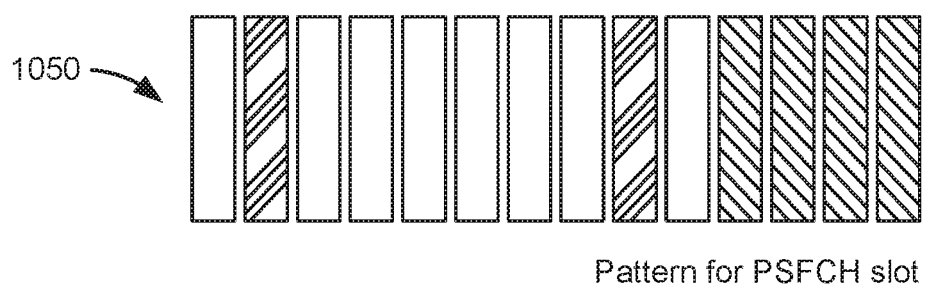
Figure 10:
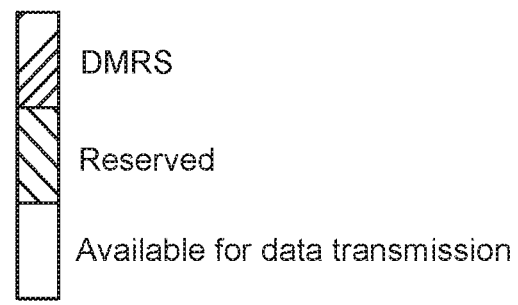

FIG. 10 illustrates example DMRS patterns for two different slot formats, according to aspects of the disclosure. In the example of FIG. 10, a sidelink established between two UEs (e.g., as described above with reference to FIG. 3) has two slot formats, one for sidelink slots with HARQ feedback resources (on the PSFCH) and the other for sidelink slots without HARQ feedback resources.

In the example of FIG. 10, two DMRS patterns have been (pre)configured, one for each of the two slot formats. The DMRS pattern 1010 is for a regular slot, and the DMRS pattern 1050 for HARQ feedback slots. Because there is only one DMRS pattern per slot format, there is no need for an index value to indicate the DMRS pattern. Rather, when a transmitter UE determines that the current slot is a regular slot, it simply uses the DMRS pattern 1010 for sidelink transmission in the current slot. Alternatively, when the transmitter UE determines that the slot is a HARQ feedback slot, it uses the DMRS pattern 1050 for sidelink transmission in the current slot.

On the receiver UE side, if the current slot is a regular slot, the receiver UE determines that the DMRS pattern 1010 applies to the slot. If, however, the slot is a HARQ feedback slot, the receiver UE determines that the DMRS pattern 1050 applies to the slot.

In the example of FIG. 10, the SCS and/or FR of the sidelink can be taken into account for the DMRS pattern (pre)configuration and determination. For example, the sidelink may be deployed on both FR1 and FR2, and as such, the FR can be taken into account. As a specific example, for FR1, the two patterns illustrated in FIG. 8 may be (pre)configured, and for FR2, the two patterns illustrated in FIG. 10 may be (pre)configured. Thus, the UE determines the DMRS pattern based on the FR over which it is transmitting or receiving and the determined slot format (i.e., with or without HARQ feedback). As another example, the sidelink may be deployed on different subcarriers, and as such, the SCS may be taken into account for the DMRS pattern (pre)configuration and determination. As a specific example, for one SCS, the two patterns illustrated in FIG. 8 may be (pre)configured, and for another SCS, the two patterns illustrated in FIG. 10 may be (pre)configured.

As described above, the slot format may be determined/defined by whether the slot includes HARQ feedback. The slot format may also be determined/defined by the number of OFDM symbols available for sidelink data channel transmission, or the number of OFDM symbols allocated to the sidelink. For example, two slot formats may be specified, one format for slots having more than nine (or other number) OFDM symbols available for the sidelink data channel, and the other format for slots having nine (or other number) or less OFDM symbols available for the sidelink data channel.

Figure 11:
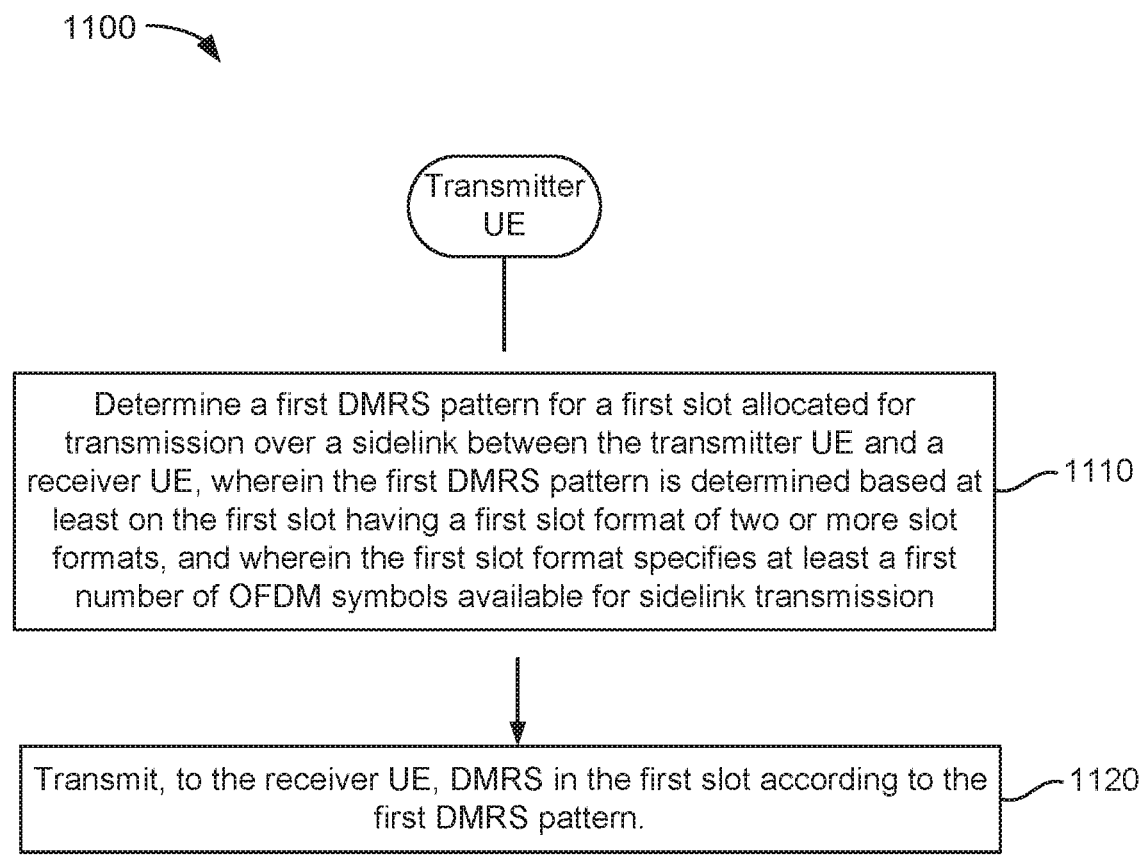
FIGS. 11 and 12 illustrate example methods of wireless communication, according to aspects of the disclosure.

FIG. 11 illustrates a method 1100 of wireless communication, according to aspects of the disclosure. In an aspect, the method 1100 may be performed by a transmitter UE, such as any of the UEs described herein.

At 1110, the UE determines a first DMRS pattern for a first slot allocated for data transmission over a sidelink between the transmitter UE and a receiver UE (e.g., any of the UEs described herein). In an aspect, the first DMRS pattern is determined based at least on the first slot having a first slot format of two or more slot formats. In an aspect, the first slot format specifies at least a first number of OFDM symbols available for sidelink transmission. In an aspect, operation 1110 may be performed by transceiver 404, processing system 410, memory 414, and/or sidelink manager 470, any or all of which may be considered means for performing this operation.

At 1120, the UE transmits, to the receiver UE, DMRS in the first slot according to the first DMRS pattern. In an aspect, operation 1120 may be performed by transceiver 404, processing system 410, memory 414, and/or sidelink manager 470, any or all of which may be considered means for performing this operation.

Figure 12:
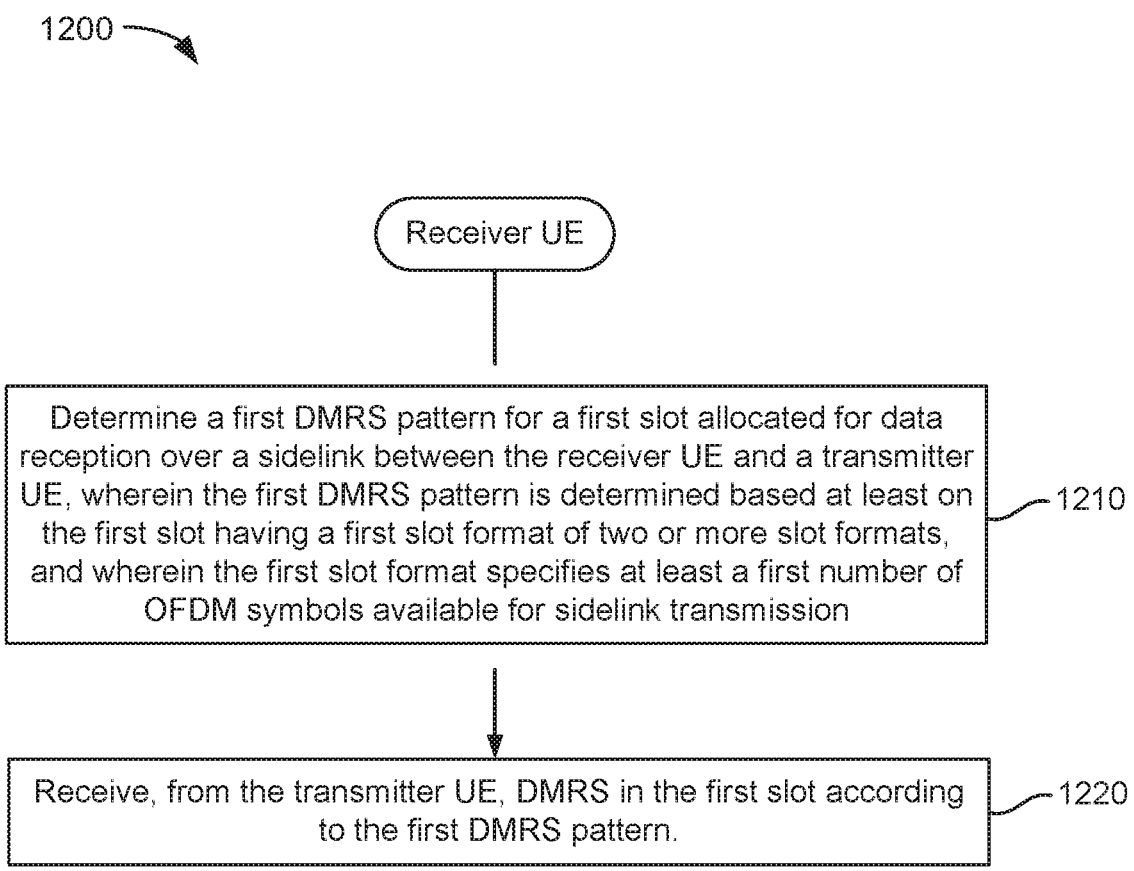

FIG. 12 illustrates a method 1200 of wireless communication, according to aspects of the disclosure. In an aspect, the method 1200 may be performed by a receiver UE, such as any of the UEs described herein.

At 1210, the UE determines a first DMRS pattern for a first slot allocated for data reception over a sidelink between the receiver UE and a transmitter UE (e.g., any of the UEs described herein). In an aspect, the first DMRS pattern is determined based at least on the first slot having a first slot format of two or more slot formats. In an aspect, the first slot format specifies at least a first number of OFDM symbols available for sidelink transmission. In an aspect, operation 1210 may be performed by transceiver 404, processing system 410, memory 414, and/or sidelink manager 470, any or all of which may be considered means for performing this operation.

At 1220, the UE receives, from the transmitter UE, DMRS in the first slot according to the first DMRS pattern. In an aspect, operation 1220 may be performed by transceiver 404, processing system 410, memory 414, and/or sidelink manager 470, any or all of which may be considered means for performing this operation.

As will be appreciated, a technical advantage of methods 1100 and 1200 is that, by selecting a DMRS pattern and utilizing simplified signaling to indicate the DMRS pattern regardless of slot format, signaling overhead is reduced.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a transmitter user equipment (UE), comprising:
    determining a first demodulation reference signal (DMRS) pattern from a first set of DMRS patterns for a first slot allocated for transmission over a sidelink between the transmitter UE and a receiver UE, wherein the first slot corresponds to a first slot format, and wherein the first set of DMRS patterns is associated with the first slot format based on
        (i) presence or absence of orthogonal frequency-division multiplexing (OFDM) symbols for sidelink feedback specified by the first slot format, and
        (ii) a subcarrier spacing (SCS), a frequency range, or both, of the sidelink;
    transmitting, to the receiver UE, an index value indicating the one of the first set of DMRS patterns that is the first DMRS pattern; and
    transmitting, to the receiver UE, DMRS in the first slot according to the first DMRS pattern,
    wherein, in a case that the first set of DMRS patterns includes two different DMRS patterns, the index value is one of two different values that respectively represent the two different DMRS patterns included in the first set of DMRS patterns, and
    wherein, in a case that the first set of DMRS patterns includes three different DMRS patterns, the index value is one of three different values that respectively represent the three different DMRS patterns included in the first set of DMRS patterns.

2. The method of claim 1, wherein the transmitter UE transmits the index value to the receiver UE in sidelink control information (SCI).

3. The method of claim 1, wherein a number of OFDM symbols allocated to DMRS, a location of OFDM symbols allocated to DMRS, DMRS type, or any combination thereof is different for each DMRS pattern in the first set of DMRS patterns.

4. The method of claim 1, further comprising:
    determining a second DMRS pattern from a second set of DMRS patterns for a second slot allocated for transmission over the sidelink, wherein the second slot corresponds to a second slot format, and wherein the second set of DMRS patterns is associated with the first slot format based on
        (i) presence or absence of OFDM symbols for the sidelink feedback specified by the second slot format, and
        (ii) the SCS, the frequency range, or both, of the sidelink; and
    transmitting, to the receiver UE, DMRS in the second slot according to the second DMRS pattern.

5. The method of claim 4, further comprising:
    transmitting, to the receiver UE, a second index value indicating the one of the second set of DMRS patterns that is the second DMRS pattern.

6. The method of claim 4, wherein:
the first slot format comprises a regular slot format without OFDM symbols allotted for the sidelink feedback, and
the second slot format comprises a feedback slot format with OFDM symbols allotted for the sidelink feedback.

7. The method of claim 4, wherein a number of OFDM symbols available for transmission on the sidelink, a starting location of OFDM symbols available for transmission on the sidelink, a starting location of OFDM symbols available for sidelink data channel transmission, an ending location of OFDM symbols available for transmission on the sidelink, an ending location of OFDM symbols available for the sidelink data channel transmission, or any combination thereof is different between the first slot format and the second slot format.

8. The method of claim 1, wherein the sidelink is deployed across at least a first subcarrier and a second subcarrier, at least a first frequency range and a second frequency range, or both.

9. The method of claim 8, wherein:
the first set of DMRS patterns is configured for slots in the first subcarrier having the first slot format, and
a second set of DMRS patterns is configured for slots in the second subcarrier having the first slot format.

10. The method of claim 8, wherein:
the first set of DMRS patterns is configured for slots in the first frequency range having the first slot format, and
a second set of DMRS patterns is configured for slots in the second frequency range having the first slot format.

11. A method of wireless communication performed by a receiver user equipment (UE), comprising:
determining, for a first slot allocated for data reception over a sidelink between the receiver UE and a transmitter UE, a first set of demodulation reference signal (DMRS) patterns, wherein the first slot corresponds to a first slot format, and wherein the first set of DMRS patterns is associated with the first slot format based on
(i) presence or absence of orthogonal frequency-division multiplexing (OFDM) symbols for sidelink feedback specified by the first slot format, and
(ii) a subcarrier spacing (SCS), a frequency range, or both, of the sidelink;
receiving, from the transmitter UE, an index value indicating one of the first set of DMRS patterns;
determining the one of the first set of DMRS patterns indicated by the index value as a first DMRS pattern for the first slot; and
receiving, from the transmitter UE, DMRS in the first slot according to the first DMRS pattern,
wherein, in a case that the first set of DMRS patterns includes two different DMRS patterns, the index value is one of two different values that respectively represent the two different DMRS patterns included in the first set of DMRS patterns, and
wherein, in a case that the first set of DMRS patterns includes three different DMRS patterns, the index value is one of three different values that respectively represent the three different DMRS patterns included in the first set of DMRS patterns.

12. The method of claim 11, wherein the receiver UE receives the index value from the transmitter UE in sidelink control information (SCI).

13. The method of claim 11, wherein a number of OFDM symbols having DMRS, a location of OFDM symbols having DMRS, DMRS type, or any combination thereof is different for each DMRS pattern in the first set of DMRS patterns.

14. The method of claim 11, further comprising:
determining, for a second slot allocated for data reception over the sidelink, a second set of DMRS patterns, wherein the second slot corresponds to a second slot format, and wherein the second set of DMRS patterns is associated with the second slot format based on
(i) presence or absence of OFDM symbols for the sidelink feedback specified by the second slot format, and
(ii) the SCS, the frequency range, or both, of the sidelink;
determining a second DMRS pattern, from the second set of DMRS patterns; and
receiving, from the transmitter UE, DMRS in the second slot according to the second DMRS pattern.

15. The method of claim 14, wherein determining the second DMRS pattern comprises:
receiving, from the transmitter UE, a second index value indicating one of the second set of DMRS patterns that is the second DMRS pattern; and
determining the one of the second set of DMRS patterns indicated by the second index value as the second DMRS pattern.

16. The method of claim 14, wherein
the first slot format comprises a regular slot format without OFDM symbols allotted for the sidelink feedback, and
the second slot format comprises a feedback slot format with OFDM symbols allotted for the sidelink feedback.

17. The method of claim 14, wherein a number of OFDM symbols available for transmission on the sidelink, a starting location of OFDM symbols available for transmission on the sidelink, a starting location of OFDM symbols available for sidelink data channel transmission, an ending location of OFDM symbols available for transmission on the sidelink, an ending location of OFDM symbols available for the sidelink data channel transmission, or any combination thereof is different between the first slot format and the second slot format.

18. The method of claim 14, wherein
a first number of OFDM symbols that are not allotted for the sidelink feedback and are available for sidelink transmission based on the first slot format is 10, and
a second number of OFDM symbols that are not allotted for the sidelink feedback and are available for sidelink transmission based on the second slot format is 13.

19. A transmitter user equipment (UE), comprising:
a memory;
at least one transceiver; and
one or more processors communicatively coupled to the memory and the at least one transceiver, the one or more processors, either alone or in combination, being configured to:
determine a first set of demodulation reference signal (DMRS) patterns for a first slot allocated for transmission over a sidelink between the transmitter UE and a receiver UE, wherein the first slot corresponds to a first slot format, and wherein the first set of DMRS patterns is associated with the first slot format based on
(i) presence or absence of orthogonal frequency-division multiplexing (OFDM) symbols for sidelink feedback specified by the first slot format, and (ii) a subcarrier spacing (SCS), a frequency range, or both, of the sidelink;

transmit, via the at least one transceiver to the receiver UE, an index value indicating the one of the first set of DMRS patterns that is the first DMRS pattern; and transmit, via the at least one transceiver to the receiver UE, DMRS in the first slot according to the first DMRS pattern, wherein, in a case that the first set of DMRS patterns includes two different DMRS patterns, the index value is one of two different values that respectively represent the two different DMRS patterns included in the first set of DMRS patterns, and wherein, in a case that the first set of DMRS patterns includes three different DMRS patterns, the index value is one of three different values that respectively represent the three different DMRS patterns included in the first set of DMRS patterns.

20. A receiver user equipment (UE), comprising:

a memory;

at least one transceiver; and one or more processors communicatively coupled to the memory and the at least one transceiver, the one or more processors, either alone or in combination, being configured to:

determine, for a first slot allocated for data reception over a sidelink between the receiver UE and a transmitter UE, a first set of demodulation reference signal (DMRS) patterns, wherein the first slot corresponds to a first slot format, and wherein the first set of DMRS patterns is associated with the first slot format based on (i) presence or absence of orthogonal frequency-division multiplexing (OFDM) symbols for sidelink feedback specified by the first slot format, and (ii) a subcarrier spacing (SCS), a frequency range, or both, of the sidelink;

receive, from the transmitter UE via the at least one transceiver, an index value indicating one of the first set of DMRS patterns;

determine the one of the first set of DMRS patterns indicated by the index value as a first DMRS pattern for the first slot; and receive, from the transmitter UE via the at least one transceiver, DMRS in the first slot according to the first DMRS pattern, wherein, in a case that the first set of DMRS patterns includes two different DMRS patterns, the index value is one of two different values that respectively represent the two different DMRS patterns included in the first set of DMRS patterns, and wherein, in a case that the first set of DMRS patterns includes three different DMRS patterns, the index value is one of three different values that respectively represent the three different DMRS patterns included in the first set of DMRS patterns.

21. The method of claim 1, wherein, in the case that the first set of DMRS patterns includes the two different DMRS patterns, the index value is 0 or 1, and wherein, in the case that the first set of DMRS patterns includes the three different DMRS patterns, the index value is 0, 1, or 2.

22. The method of claim 11, wherein, in the case that the first set of DMRS patterns includes the two different DMRS patterns, the index value is 0 or 1, and wherein, in the case that the first set of DMRS patterns includes the three different DMRS patterns, the index value is 0, 1, or 2.

23. The transmitter UE of claim 19, wherein, in the case that the first set of DMRS patterns includes the two different DMRS patterns, the index value is 0 or 1, and wherein, in the case that the first set of DMRS patterns includes the three different DMRS patterns, the index value is 0, 1, or 2.

24. The receiver UE of claim 20, wherein, in the case that the first set of DMRS patterns includes the two different DMRS patterns, the index value is 0 or 1, and wherein, in the case that the first set of DMRS patterns includes the three different DMRS patterns, the index value is 0, 1, or 2.

* * * * *